United States Patent
Poole et al.

(10) Patent No.: US 10,755,337 B2
(45) Date of Patent: Aug. 25, 2020

(54) SYSTEM AND METHOD FOR GENERATING USER CUSTOMIZED ORDER INTERFACE

(71) Applicant: Capital One Services, LLC, McLean, VA (US)

(72) Inventors: Thomas S. Poole, Chantilly, VA (US); Apurva Shah, San Mateo, CA (US); Jennifer Lopez, Brooklyn, NY (US); Paul Moreton, Glen Allen, VA (US); Taurean Butler, Brooklyn, NY (US); Jason DePerro, San Mateo, CA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 263 days.

(21) Appl. No.: 15/942,967

(22) Filed: Apr. 2, 2018

(65) Prior Publication Data

US 2018/0225743 A1 Aug. 9, 2018

Related U.S. Application Data

(63) Continuation of application No. 15/689,620, filed on Aug. 29, 2017, now Pat. No. 9,965,797.

(60) Provisional application No. 62/411,551, filed on Oct. 22, 2016.

(51) Int. Cl.
*G06Q 30/06* (2012.01)

(52) U.S. Cl.
CPC ..... *G06Q 30/0631* (2013.01); *G06Q 30/0623* (2013.01); *G06Q 30/0633* (2013.01); *G06Q 30/0639* (2013.01)

(58) Field of Classification Search
CPC .......... G06Q 30/0633; G06Q 30/0623; G06Q 30/0631; G06Q 30/0639

USPC .......... 705/26.61, 26.8, 26.7, 26.9
See application file for complete search history.

(56) References Cited

U.S. PATENT DOCUMENTS

| | | | |
|---|---|---|---|
| 9,619,831 B1* | 4/2017 | Kumar | G06Q 30/0631 |
| 10,204,359 B1* | 2/2019 | Lee | G06Q 30/0255 |
| 2010/0061294 A1 | 3/2010 | Proctor et al. | |
| 2010/0306080 A1* | 12/2010 | Trandal | G06Q 10/10 705/26.8 |
| 2011/0246370 A1 | 10/2011 | Wang et al. | |
| 2013/0317921 A1* | 11/2013 | Havas | G06Q 30/0633 705/15 |

(Continued)

*Primary Examiner* — Yogesh C Garg
(74) *Attorney, Agent, or Firm* — Troutman Pepper Hamilton Sanders LLP; Christopher J. Forstner; John A. Morrissett

(57) ABSTRACT

A system and method for generating a user customized order interface, which displays a customer's previous orders and corresponding specific order information and order recommendations, that may be utilized for ordering and payment. A mobile application may request a merchant ID upon determination by the mobile device that a customer is within a close proximity of a particular merchant location. A payment terminal may pass the corresponding merchant ID to a transaction system, which may retrieve, for example, the customer's previous transactions and corresponding transaction IDs associated with the merchant ID, which may be utilized to generate a user customized order interface, which may be utilized to initiate a transaction by selecting a specific order item to order, and which may utilize the mobile application to confirm the order and proceed to payment, which will transmit the order to a merchant system.

11 Claims, 12 Drawing Sheets

(56) References Cited

U.S. PATENT DOCUMENTS

| | | |
|---|---|---|
| 2014/0074569 A1 | 3/2014 | Francis et al. |
| 2014/0222708 A1* | 8/2014 | Becker .............. G06Q 10/0833 |
| | | 705/333 |
| 2015/0039462 A1* | 2/2015 | Shastry .............. G06Q 30/0633 |
| | | 705/26.7 |
| 2015/0294362 A1 | 10/2015 | Royyuru et al. |
| 2016/0042342 A1* | 2/2016 | Proctor, Jr. ............. H04W 4/80 |
| | | 705/39 |
| 2016/0086029 A1* | 3/2016 | Dubuque ........... G06K 9/00536 |
| | | 382/159 |
| 2016/0092858 A1 | 3/2016 | Giles et al. |
| 2019/0362263 A1* | 11/2019 | Harris ................. G06F 16/9038 |
| 2020/0005192 A1* | 1/2020 | Kumar .................. G06N 20/00 |

* cited by examiner

SYSTEM AND METHOD FOR GENERATING USER CUSTOMIZED ORDER INTERFACE

CROSS REFERENCE TO RELATED APPLICATION

The subject application claims the benefit of U.S. Provisional Patent Application No. 62/411,551, filed on Oct. 22, 2016, the contents of which is hereby incorporated by reference in their entireties

FIELD OF THE DISCLOSURE

The present disclosure relates to systems and methods for generating a user customized order interface that provides a smart shopping experience, which displays a customer's previous orders and corresponding specific order information and order recommendations, that may be utilized for ordering and payment.

BACKGROUND OF THE DISCLOSURE

Currently a customer is not able to access past merchant orders using a mobile device in a way such that the customer is presented with past orders, which may be utilized when making future orders. Using conventional mobile wallet applications, a customer may retrieve limited transaction information, generally a transaction amount, merchant location and an associated timestamp associated with past merchant orders.

In order to repeat past orders quickly, a customer needs a customized menu based on past orders. While individual merchants may provide a mobile application that may enable customers to complete orders and associated payments, it is burdensome for customers to download and configure multiple mobile applications associated with individual merchants. Additionally, smaller merchants may not have the infrastructure to develop such mobile applications.

These and other drawbacks exist.

SUMMARY OF THE DISCLOSURE

Various embodiments of the present disclosure provide systems and methods for generating a user customized order interface, which displays a customer's previous orders and corresponding specific order information and order recommendations, that may be utilized for ordering and payment.

A mobile application on a customer's mobile device may request a merchant ID of a particular merchant by sending a message to a merchant system. The mobile application may request a merchant ID upon determination by the mobile device that a customer is within a close proximity of a particular merchant location.

A payment terminal may pass the corresponding merchant ID to a transaction system, which may retrieve, for example, the customer's previous transactions and corresponding transaction IDs associated with the merchant ID, which may be stored in data storage. The transaction system may send the transaction IDs to a merchant system via the mobile application, and may request specific order information associated with the transmitted transaction IDs. The specific order information may include the individual items included in the transaction, and may additionally include stock keeping unit (SKU) level inventory information. The specific order information may also include additional specific details pertaining to the individual items.

The merchant system may send the specific order information to the mobile application. Upon receipt of the specific order information, a transaction system may store the specific order information in data storage, and may generate via the mobile application a user customized order interface, which displays the customer's previous orders and corresponding specific order information. Using the generated customized interface, a customer may initiate a transaction by selecting a specific order item to order, and may utilize the mobile application to confirm the order and proceed to payment, which will transmit the order to a merchant system.

In an example embodiment, a customer's prior transaction data and specific order information may be utilized to generate order recommendations, and targeted offers, rewards, and advertisements for a customer based on the past transactions and alternately or additionally members of a customer's social network's past transactions. The generated recommendations may be utilized across various merchants. The generated recommendations may additionally be utilized to generate a customer profile.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

The following description is intended to convey a thorough understanding of the embodiments described by providing a number of specific example embodiments and details involving generating a user customized order interface based on past orders that may be utilized for ordering and payment. Merchants may include, for example restaurants, hotels, stores, etc. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs. A point-of-sale (PoS) terminal and payment gateway, and mobile device are used as examples for the disclosure. The disclosure is not intended to be limited to point-of-sale (PoS) terminals and payment gateways, and mobile devices only. For example, many other electronic devices may utilize an open distributed system to generate a user customized order interface based on past orders that may be utilized for ordering and payment.

Figure 1:
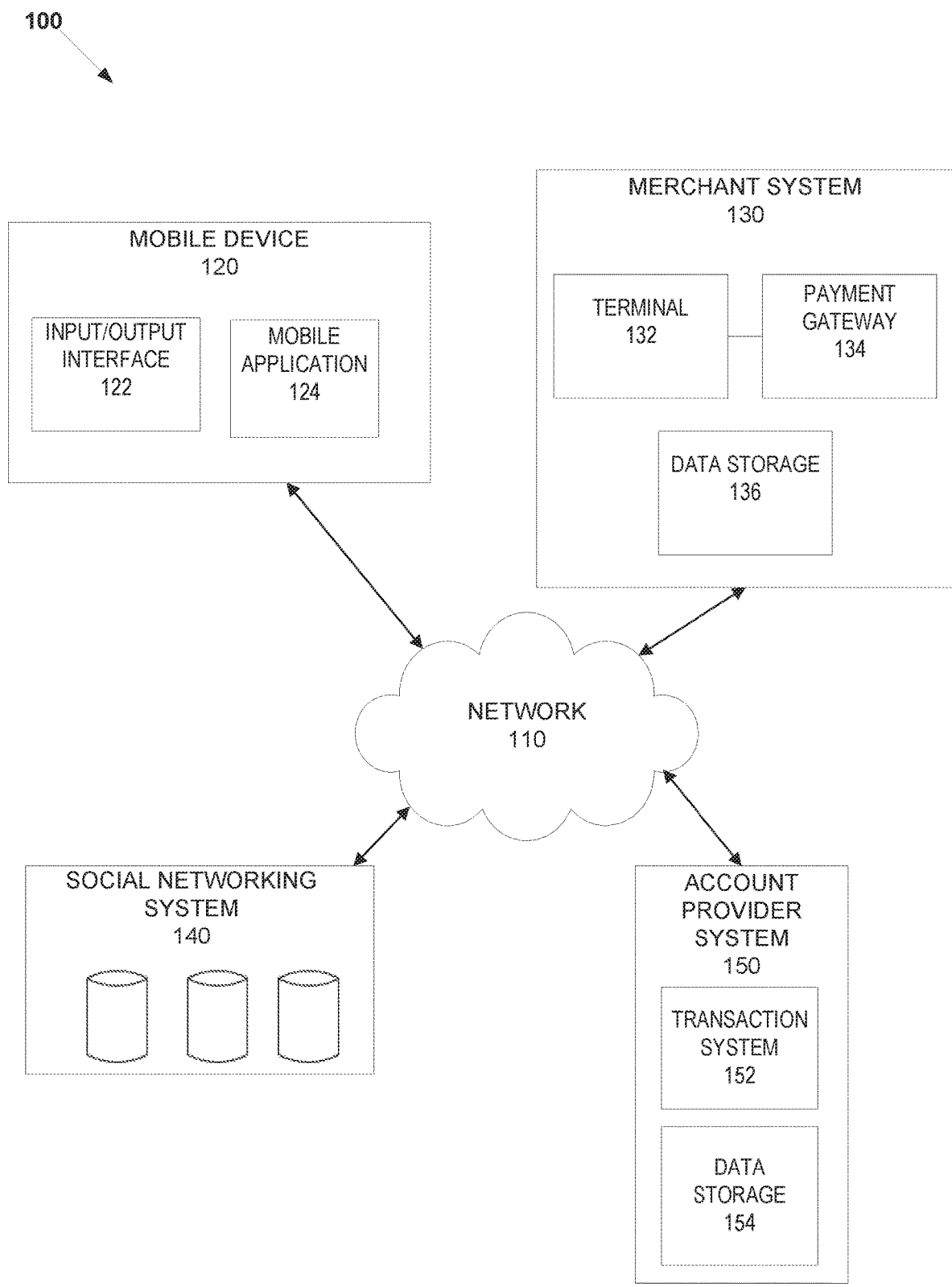
FIG. 1 depicts an example system for generating a user customized order interface that may be utilized for ordering and payment, according to embodiments of the disclosure.

FIG. 1 depicts an example system 100 for generating a user customized order interface that may be utilized for ordering and payment. As shown in FIG. 1, an example system 100 may include one or more mobile devices 120, one or more merchant systems 130, one or more social networking systems 140, and one or more account providers systems 150 connected over one or more networks 110.

For example, network 110 may be one or more of a wireless network, a wired network or any combination of wireless network and wired network. For example, network 110 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, a Bluetooth network, or any other wired or wireless network for transmitting and receiving a data signal.

In addition, network 110 may include, without limitation, telephone lines, fiber optics, IEEE Ethernet 902.3, a wide area network ("WAN"), a local area network ("LAN"), a wireless personal area network ("WPAN"), or a global network such as the Internet. Also network 110 may support an Internet network, a wireless communication network, a cellular network, or the like, or any combination thereof. Network 110 may further include one network, or any number of the example types of networks mentioned above, operating as a stand-alone network or in cooperation with each other. Network 110 may utilize one or more protocols of one or more network elements to which they are communicatively coupled. Network 110 may translate to or from other protocols to one or more protocols of network devices. Although network 110 is depicted as a single network, it should be appreciated that according to one or more embodiments, network 110 may comprise a plurality of interconnected networks, such as, for example, the Internet, a service provider's network, a cable television network, corporate networks, and home networks.

Mobile device 120 and/or merchant system 130 may include, for example, one or more mobile devices, such as, for example, personal digital assistants (PDA), tablet computers and/or electronic readers (e.g., iPad, Kindle Fire, Playbook, Touchpad, etc.), wearable devices (e.g., Google Glass), telephony devices, smartphones, cameras, music playing devices (e.g., iPod, etc.), televisions, set-top-box devices, and the like.

Account provider system 150, mobile device 120, merchant system 130, and/or social networking system 140 also may include a network-enabled computer system and/or device. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. For example, account provider system, which may include a mobile wallet system, may include components such as those illustrated in FIG. 3. Merchant system may include, for example, components illustrated in FIG. 2.

Account provider system 150, mobile device 120, merchant system 130, and/or social networking system 140, may include at least one central processing unit (CPU), which may be configured to execute computer program instructions to perform various processes and methods. Account provider system 150, mobile device 120, merchant system 130, and/or social networking system 140 may include data storage, including for example, random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel® file, Microsoft® Access® file, a solid state storage device, which may include an all flash array, a hybrid array, or a server-side product, enterprise storage, which may include online or cloud storage, or any other storage mechanism.

Account provider system 150, mobile device 120, merchant system 130, and/or social networking system 140 may further include, for example, a processor, which may be several processors, a single processor, or a single device having multiple processors. Although depicted as single elements, it should be appreciated that according to one or more embodiments, account provider system 150, mobile device 120, merchant system 130, and/or may comprise a plurality of account provider systems 130, user devices 140, and/or merchant systems 150.

As shown in FIG. 1, each account provider system 150, mobile device 120, merchant system 130, and/or social networking system 140 may include various components. As used herein, the term "component" may be understood to refer to computer executable software, firmware, hardware, and/or various combinations thereof. It is noted there where a component is a software and/or firmware component, the component is configured to affect the hardware elements of an associated system. It is further noted that the components shown and described herein are intended as examples. The components may be combined, integrated, separated, or duplicated to support various applications. Also, a function described herein as being performed at a particular component may be performed at one or more other components and by one or more other devices instead of or in addition to the function performed at the particular component. Further, the components may be implemented across multiple devices or other components local or remote to one another. Additionally, the components may be moved from one device and added to another device, or may be included in both devices.

As depicted in FIG. 1, system 100 may include mobile device 120, which may be any device capable of communicating via, for example, Bluetooth technology, NFC technology, WiFi Direct technology, and/or the like and execute various functions to transmit and receive account data (e.g., card number, account type, account balance, account limits, budget data, recent transactions, and/or the like). For example, mobile device 120 could be an iPhone, iPod, iPad, and/or Apple Watch from Apple® or other mobile device running Apple's iOS operating system, devices running Google's Android® operating system, including, for example, smartphones running the Android® operating system and other wearable mobile devices, such as Google Glass or Samsung Galaxy Gear Smartwatch, devices running Microsoft's Windows® Mobile operating system, and/or any other smartphone, smartwatch, tablet, or like device.

Mobile device 120 may include for example, an input/output device 122 and a mobile application 124. Input/output device 122 may include, for example, a Bluetooth device or chipset with a Bluetooth transceiver, a chip, and an antenna. The transceiver may transmit and receive information via the antenna and an interface. The chip may include a microprocessor that stores and processes information specific to a dynamic transaction device and provides device control functionality. Device control functionality may include connection creation, frequency-hopping sequence selection and timing, power control, security control, polling, packet processing, and the like. The device control functionality and other Bluetooth-related functionality may be supported using a Bluetooth API provided by the platform associated with the mobile device 120 (e.g., The Android platform, the iOS platform). Using a Bluetooth API, an application stored on a mobile device 120 (e.g., a banking application, a financial account application, etc.) or the device may be able to scan for other Bluetooth devices, query the local Bluetooth adapter for paired Bluetooth devices, establish RFCOMM channels, connect to other devices through service discovery, transfer data to and from other devices, and manage multiple connections. A Bluetooth API used in the methods, systems, and devices described herein may include an API for Bluetooth Low Energy (BLE) to provide significantly lower power consumption and allow a mobile device 120 to communicate with BLE devices that have low power requirements.

Input/output device 122 may include for example, I/O devices, which may be configured to provide input and/or output to mobile device 120 (e.g., keyboard, mouse, display, speakers, printers, modems, network cards, etc.). Input/output device 122 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of mobile device 120, and a bus that allows communication among the various components of mobile device 120. Input/output device 122 may include a display, which may include for example output devices, such as a printer, display screen (e.g., monitor, television, and the like), speakers, projector, and the like. Although not shown, each mobile device 140 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Input/output device 122 may also include an NFC antenna and secure element (SE). The SE may be a hardware chip specially designed to be tamper proof. In one embodiment, the SE may be used for digitally and physically secure storage of sensitive data, including transaction card data, payment data, health records, car key identifiers, etc. The SE may, for example, store information related to a person, customer, financial institution, or other entity. The SE may store information related to a financial account, such as, for example, transaction card data (e.g., a credit card number, debit account number, or other account identifier, account balance, transaction history, account limits, budget data, recent transactions, and/or the like). The SE may include a computer processor or other computational hardware or software. As one example, the secure element may contain the Visa® and MasterCard® applications for PayWave® and PayPass® transactions. A secure element may take the form of a universal integrated circuit card (UICC) and/or a microSD card. A UICC may identify a user to a wireless operator, store contacts, enable secure connections, and add new applications and services, such as a transaction system.

Input/output device 122 may enable Industry Standard NFC Payment Transmission. For example, the input/output device 122 may enable two loop antennas to form an air-core transformer when placed near one another by using magnetic induction. Input/output device 122 may operate at 13.56 MHz or any other acceptable frequency. Also, input/output device 122 may provide for a passive communication mode, where the initiator device provides a carrier field, permitting answers by the target device via modulation of existing fields. Additionally, input/output device 122 also may provide for an active communication mode by allowing alternate field generation by the initiator and target devices.

Input/output device 122 may deactivate the RF field while awaiting data. The attachment may use Miller-type coding with varying modulations, including 100% modulation. The attachment may also use Manchester coding with varying modulations, including a modulation ratio of 10%. Additionally, the attachment may be capable of receiving and transmitting data at the same time, as well as checking for potential collisions when the transmitted signal and received signal frequencies differ.

Input/output device 122 may be capable of utilizing standardized transmission protocols, for example but not by way of limitation, ISO/IEC 14443 A/B, ISO/IEC 18092, MiFare, FeliCa, tag/smartcard emulation, and the like. Also, input/output device 122 may be able to utilize transmission protocols and methods that are developed in the future using other frequencies or modes of transmission. Input/output device 122 may also be backwards-compatible with existing techniques, for example RFID. Also, the system may support transmission requirements to meet new and evolving standards including internet based transmission triggered by NFC.

The current location of mobile device 120 may be determined using many different technologies such as GPS technology, Internet-based technology, etc., which may utilize location data. By way of example, location data may include, but is not limited to GPS data, assisted GPS data, IP address data, cell ID data, received signal strength indication (RSSI) data, wireless fingerprinting data, inertial sensor data (e.g., compass or magnetometer data, accelerometer data, and/or gyroscope data), barometer data, ultrasonic data (e.g., radio-frequency identification (RFID) data, near-field communication (NFC) data), Bluetooth data, and/or terrestrial transmitter data.

Mobile device 120 may also include various software components to facilitate the account and payment operations including an App Processor. For example, mobile device 120 may include an operating system such as, for example, the iOS® operating system from Apple®, the Google® Android® operating system, and the Windows Mobile® operating system from Microsoft®. Mobile device 120 may also include, without limitation, software applications such as mobile banking applications and financial institution applications to facilitate ordering and payment, an NFC application programming interface, and software to enable touch sensitive displays. Mobile device manufacturers may provide software stacks or Application Programming Interfaces (APIs) which allow software applications to be written on top of the software stacks. For example, mobile device manufacturers may provide, without limitation, a card emulation API to enable NFC card emulation mode, a logic link control protocol (LLCP) API for peer-to-peer communication between mobile devices, a Bluetooth® API supporting BLE, and a real-time data (RTD) API and a NFC Data Exchange Format (NDEF) API for reading/writing.

The App Processor may enable execution of software applications on mobile device 120. In various embodiments, the App Processor may cooperate with the NFC technology to enable a payment using mobile device 120. Additionally, mobile device 120 may include an attachment for contactless payments (not shown), such as a contactless payment attachment that plugs into an audio jack or plug of a mobile device.

The App Processor may enable execution of a mobile wallet application, which may include various user interfaces, which may leverage transaction data, wireless data connection, over-the-air data connection, or other means of data transmission. The data used in the application may be transmitted, for example, from external data sources. For example, the application and user interface may leverage information about products and/or services being purchased, information about the account or account holder, information about the merchant and/or other parties involved in a transaction, rewards information, promotional information, advertising information, and other useful information.

Software applications on mobile device 140 may include, for example, mobile application 124, which may be integrated with or separate from a mobile wallet application, which may be utilized to generate a user customized order interface, which displays the customer's previous orders and corresponding specific order information.

Figure 2:
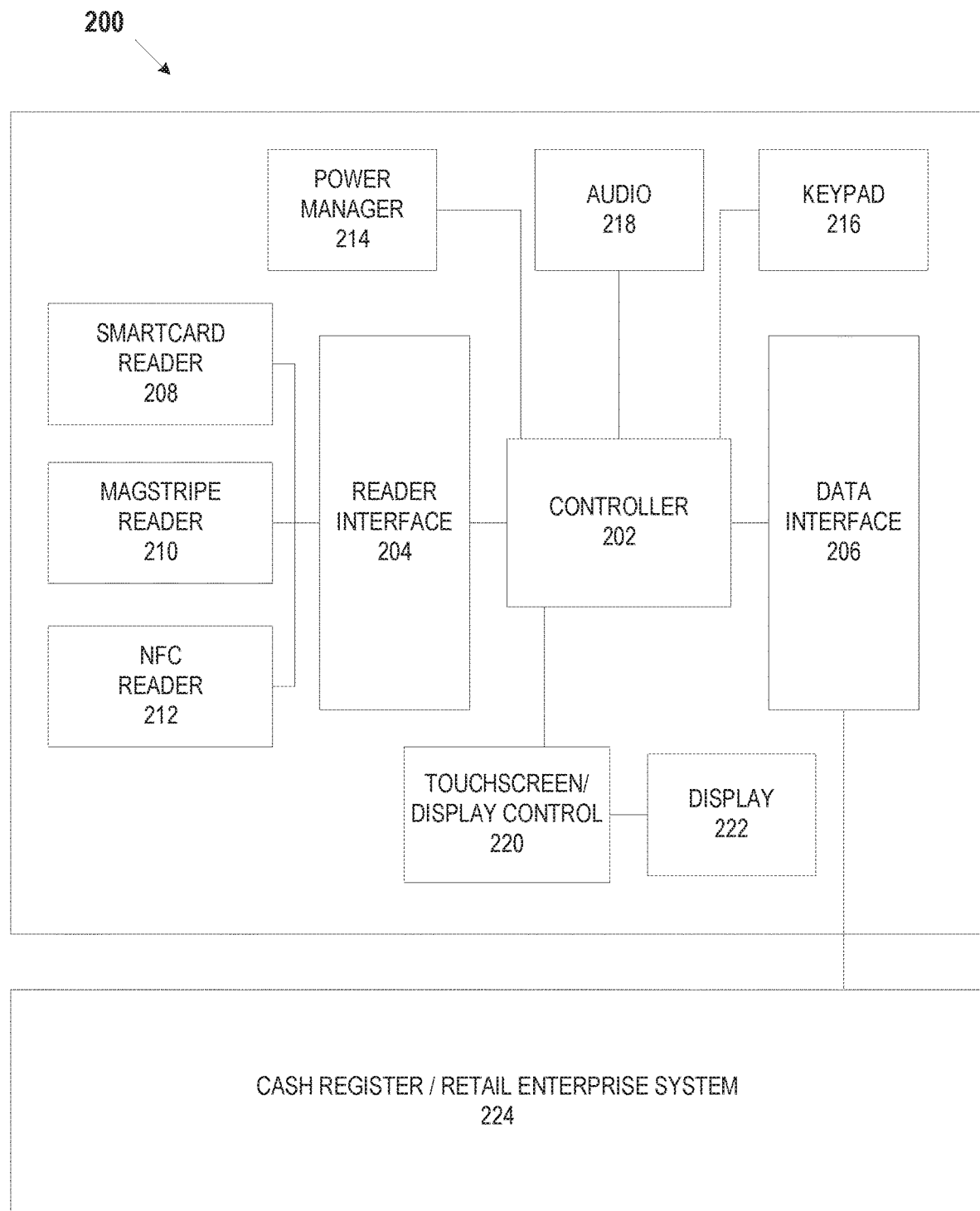
FIG. 2 depicts an example system including a point-of-sale (PoS) device, according to embodiments of the disclosure.

Merchant system 130 may include, among other components, a Point-of-Sale (PoS) device. As illustrated in FIG. 2, a PoS device may include a variety of readers to read transaction data associated with a transaction taking place with a merchant. PoS device may include various hardware and/or software components required to conduct and process transaction. Merchant system 130 may also include data storage 136 to store transaction data and/or approval of charges between an cardholder and the merchant associated with the PoS device.

A PoS system may include a terminal 132 and a payment gateway 134, cloud storage and API. Terminal 132 and payment gateway 134 may comprise the physical or virtual device(s) used by merchant system 130 to communicate information to a remote processor of the merchant system. Terminal 132 may include an EMV card reader to interact with a dynamic transaction card. Terminal 132 may include a smart payment terminal, such as those provided by Square®, Poynt®, and Clover®. Terminal 132 may function to provide standard compliant payment processing, and may act as a merchant data aggregator by enabling access to merchant-level information, which may be stored in data storage 136. Terminal 132 may function to collect payment information associated with orders or transactions for the merchant, and may additionally function as a platform through which third party applications, such as account provider system 150, may access payment and transaction information. Terminal 132 enables application interaction with transaction data generated by traditional payment terminals, and may also interact with a remote system which may function to store merchant information.

Terminal 132 may function to generate or otherwise process order information. Order information may include transaction information, cart or product information (e.g., product identifier, number of each product, etc.), customer identifiers, merchant identifiers, employee identifiers, order status (e.g., completed, open, paid but not picked up, etc.), or any other suitable order information. Transaction information may include a transaction identifier, transaction amount, merchant information, customer identifier, payment type, terminal identifier, and/or any other suitable information about the transaction. The transaction identifier may be universally unique, unique to the merchant, unique to the customer identifier, generic, or be defined in any other suitable manner. Merchant system 130 may access and download transaction and order data, and ma control which applications have access to particular pieces of data.

Terminal 132 may include communications systems that may function to communicate data with external systems, determine inventory based on inventory signals, connect to peripheral devices (e.g., printers, scanners, registers), and user devices. The communications systems may be wired or wireless. The wireless communications systems may be WiFi, cellular, satellite, RF, IR, Bluetooth, BLE, NFC or any other suitable module.

In various embodiments, payment gateway 134 may be an e-commerce application service provider service that authorizes payments for merchants. The system may utilize biometric authorization, location authentication and payment token processing to facilitate payment authorization. As such, payment gateway 134 may be a virtual equivalent of a PoS terminal and interface with, for example, a billing system of merchant system 130 and pass data to a remote processor of the merchant system.

Although not shown, merchant system 130 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Account provider system 150 may include systems associated with, for example, a banking service company such as Capital One®, Bank of America®, Citibank®, Wells Fargo®, Sun Trust®, various community banks, and the like, as well as a number of other financial institutions such as Visa®, MasterCard®, and American Express® that issue credit and/or debit cards, for example, as transaction cards. Account provider system 150 may include and/or be connected to one or more computer systems and networks to process transactions. For example, account provider system 150 may process transactions as shown and described in FIGS. 4 and 5 below. Account provider system 150 may include systems associated with financial institutions that issue transaction cards, including dynamic transaction cards, and maintains a contract with cardholders for repayment. In various embodiments, an account provider system 150 may issue credit, debit, and/or stored value account. for example. Account provider system 150 may include, by way of example and not limitation, depository institutions (e.g., banks, credit unions, building societies, trust companies, mortgage loan companies, pre-paid gift cards or credit cards, etc.), contractual institutions (e.g., insurance companies, pension funds, mutual funds, etc.), investment institutions (e.g., investment banks, underwriters, brokerage funds, etc.), and other non-bank financial institutions (e.g., pawn shops or brokers, cashier's check issuers, insurance firms, check-cashing locations, payday lending, currency exchanges, microloan organizations, crowd-funding or crowd-sourcing entities, third-party payment processors, etc.).

Account provider system 130 may include a transaction system 152 and data storage 154. Transaction system 134 may include various hardware and software components to communicate between a merchant, acquisition system, account provider system, and/or a user device to process a transaction, such as a user purchase. Data storage 154 may store data associated with an account (e.g., card number, account type, account balance, account limits, budget data, recent transactions, pairing data such as time and date of pairing with a mobile device, and the like) and account holder data (e.g., account holder name, address, phone number(s), email address, demographic data, and the like).

System 100 may also include a social networking system 140, which may communicate with social networking sites, which may include, without limitation, Facebook, MySpace, Google+, LinkedIn, Twitter, Pinterest, Instagram, etc. The social networking site may include a plurality of social networking accounts created by one or more users. The users may also be account holders with account provider system 150.

Referring to FIG. 2, an example PoS device 200 is shown. PoS device 200 may include a controller 202, a reader interface 204, a data interface 206, a smartcard and/or EMV chip reader 208, a magnetic stripe reader 210, a near-field communications (NFC) reader 212, a power manager 214, a keypad 216, an audio interface 218, a touchscreen/display controller 220, and a display 222. Also, PoS device 200 may be coupled with, integrated into or otherwise connected with a cash register/retail enterprise system 224.

In various embodiments, controller 202 may be any controller, central processing unit, or other processor capable of controlling the operations of PoS device 200. For example, controller 202 may be an Intel® 2nd Generation Core™ i3, i5, or Core 2 Duo or Pentium™ G850, Qualcomm's Snapdragon, Nvidia Tegra/Tegra 2, TI OMAP 3/4, and various other implementations of ARM Cortex A8/A9 processor or the like. Controller 202 also may be a controller included in a personal computer, smartphone device, tablet PC or the like.

Reader interface 204 may provide an interface between the various reader devices associated with PoS device 200. For example, reader interface 204 may provide an interface between smartcard and/or EMV chip reader 208, magnetic stripe reader 210, NFC reader 212 and controller 202. In various embodiments, reader interface 204 may be a wired interface such as a USB, RS232 or RS485 interface and the like. Reader interface 204 also may be a wireless interface and implement technologies such as Bluetooth®, the 802.11 (x) wireless specifications and the like. Reader interface 204 may enable communication of information read by the various reader devices from the various reader devices to PoS device 200 to enable transactions. For example, reader interface 204 may enable communication of a credit or debit card number read by a reader device from that device to PoS device 200. In various embodiments, reader interface 204 may interface between PoS device 200 and other devices that do not necessarily "read" information but instead receive information from other devices.

Data interface 206 may allow PoS device 200 to pass communicate data throughout PoS device and with other devices including, for example, cash register/retail enterprise system 224. Data interface 206 may enable PoS device 200 to integrate with various customer resource management (CRM) and/or enterprise resource management (ERP) systems. Data interface 206 may include hardware, firmware and software that make aspects of data interface 206 a wired interface. Data interface 206 also may include hardware, firmware and software that make aspects of data interface 206 a wireless interface. In various embodiments, data interface 206 also enables communication between PoS device other devices.

Smartcard and/or EMV chip reader 208 may be any electronic data input device that reads data from a dynamic transaction card and/or EMV processor. Smartcard and/or EMV chip reader 208 may be capable of supplying an integrated circuit (e.g., EMV processor) on the dynamic transaction card with electricity and communicating with the dynamic transaction card via protocols, thereby enabling read and write functions. In various embodiments, smartcard and/or EMV chip reader 208 may enable reading from contact or contactless transaction cards. Smartcard and/or EMV chip reader 208 also may communicate using standard protocols including ISO/IEC 7816, ISO/IEC 14443 and/or the like or proprietary protocols.

Magnetic stripe reader 210 may be any electronic data input device that reads data from a magnetic stripe on a credit or debit card, for example. In various embodiments, magnetic stripe reader 210 may include a magnetic reading head capable of reading information from a magnetic stripe. Magnetic stripe reader 210 may be capable of reading, for example, cardholder information from tracks 1, 2, and 3 on magnetic cards. In various embodiments, track 1 may be written on a card with code known as DEC SIXBIT plus odd parity and the information on track 1 may be contained in several formats (e.g., format A, which may be reserved for proprietary use of the card issuer; format B; format C-M which may be reserved for us by ANSI subcommittee X3B10; and format N-Z, which may be available for use by individual card issuers). In various embodiments, track 2 may be written with a 5-bit scheme (4 data bits plus 1 parity). Track 3 may be unused on the magnetic stripe. In various embodiments, track 3 transmission channels may be used for transmitting dynamic data packet information to further enable enhanced token-based payments.

NFC reader 212 may be any electronic data input device that reads data from a NFC device. In an example embodiment, NFC reader 212 may enable Industry Standard NFC Payment Transmission. For example, the NFC reader 212 may communicate with a NFC enabled device to enable two loop antennas to form an air-core transformer when placed near one another by using magnetic induction. NFC reader 212 may operate at 13.56 MHz or any other acceptable frequency. Also, NFC reader 212 may enable a passive communication mode, where an initiator device provides a carrier field, permitting answers by the target device via modulation of existing fields. Additionally, NFC reader 212 also may enable an active communication mode by allowing alternate field generation by the initiator and target devices.

In various embodiments, NFC reader 212 may deactivate an RF field while awaiting data. NFC reader 212 may receive communications containing Miller-type coding with varying modulations, including 100% modulation. NFC reader 212 also may receive communications containing Manchester coding with varying modulations, including a modulation ratio of approximately 10%, for example. Additionally, NFC reader 212 may be capable of receiving and transmitting data at the same time, as well as checking for potential collisions when the transmitted signal and received signal frequencies differ.

NFC reader 212 may be capable of utilizing standardized transmission protocols, for example but not by way of limitation, ISO/IEC 14443 A/B, ISO/IEC 18092, MiFare, FeliCa, tag/smartcard emulation, and the like. Also, NFC reader 212 may be able to utilize transmission protocols and methods that are developed in the future using other frequencies or modes of transmission. NFC reader 212 also may be backwards-compatible with existing payment techniques, such as, for example RFID. Also, NFC reader 212 may support transmission requirements to meet new and evolving payment standards including internet based transmission triggered by NFC. In various embodiments, NFC reader 212 may utilize MasterCard's® PayPass® and/or Visa's® PayWave® and/or American Express'® ExpressPay® systems to enable transactions.

Although not shown and described, other input devices and/or readers, such as for example, barcode readers and the like are contemplated.

Power manager 214 may be any microcontroller or integrated circuit that governs power functions of PoS device 200. Power manager 214 may include, for example, firmware, software, memory, a CPU, a CPU, input/output functions, timers to measure intervals of time, as well as analog to digital converters to measure the voltages of the main In this manner, when a dynamic transaction card is exposed to light, the LED display of the dynamic transaction card may detect light, and transmit the light signals from the LED to the microprocessor/microcontroller, such as microprocessor/ microcontroller and/or a bootloader, such as bootloader to activate the dynamic transaction card.

In various embodiments, Power manager 214 remains active even when PoS device 200 is completely shut down, unused, and/or powered by the backup energy storage component. Power manager 214 may be responsible for coordinating many functions, including, for example, monitoring power connections and energy storage component charges, charging batteries when necessary, controlling power to other integrated circuits within PoS device 200 and/or other peripherals and/or readers, shutting down unnecessary system components when they are left idle, controlling sleep and power functions (on and off), managing the interface for built-in keypad and trackpads, and/or regulating a real-time clock (RTC).

Keypad 216 may any input device that includes a set of buttons arranged, for example, in a block or pad and may bear digits, symbols and/or alphabetical letters. Keypad 216 may be a hardware-based or mechanical-type keypad and/or implemented in software and displayed on, for example, a screen or touch screen to form a keypad. Keypad 216 may receive input from a user that pushed or otherwise activates one or more buttons on keypad 216 to provide input.

Audio interface 218 may be any device capable of providing audio signals from PoS device 200. For example, audio interface may be a speaker or speakers that may produce audio signals. In various embodiments, audio interface 218 may be integrated within PoS device 200. Audio interface 218 also may include components that are external to PoS device 200.

Touchscreen/display control 220 may be any device or controller that controls an electronic visual display. Touchscreen/display control 220 may allow a user to interact with PoS device 200 through simple or multi-touch gestures by touching a screen or display (e.g., display 222). Touchscreen/display control 220 may be configured to control any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, touchscreen/display control 220 may receive inputs from the touchscreen and process the received inputs. Touchscreen/display control 220 also may control the display on PoS device 200, thereby providing the graphical user interface on a display to a user of PoS device 200.

Display 222 may be any display suitable for a PoS device. For example, display 222 may be a TFT, LCD, LED or other display. Display 222 also may be a touchscreen display that for example allows a user to interact with PoS device 200 through simple or multi-touch gestures by touching a screen or display (e.g., display 222). Display 222 may include any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, 222 may receive inputs from control gestures provided by a user. Display 222 also may display images, thereby providing the graphical user interface to a user of PoS device 200.

Cash register/retail enterprise system 224 may include any device or devices that cooperate with PoS device 200 to process transactions. Cash register/retail enterprise system 224 may be coupled with other components of PoS device 200 via, for example, a data interface (e.g., data interface 206). Cash register/retail enterprise system 224 also may be integrated into PoS device 200.

In various embodiments, cash register/retail enterprise system 224 may be a cash register. Example cash registers may include, for example, mechanical or electronic devices that calculate and record sales transactions. Cash registers also may include a cash drawer for storing cash and may be capable of printing receipts. Cash registers also may be connected to a network to enable payment transactions. Cash registers may include a numerical pad, QWERTY or custom keyboard, touch screen interface, or a combination of these input methods for a cashier to enter products and fees by hand and access information necessary to complete the sale.

In various embodiments, cash register/retail enterprise system 224 may comprise an retail enterprise system and/or a customer relationship management system. Retail enterprise system 224 may enable retain enterprises to manage operations and performance across a retail operation. Retail enterprise system 224 may be a stand-alone application in, for example, individual stores, or may be interconnected via a network. Retail enterprise system 224 may include various point of sale capabilities, including the ability to, for example, customize and resize transaction screens, work with a "touch screen" graphical user interface, enter line items, automatically look up price (sales, quantity discount, promotional, price levels), automatically compute tax, VAT, look up quantity and item attribute, display item picture, extended description, and sub-descriptions, establish default shipping services, select shipping carrier and calculate shipping charges by weight/value, support multi-tender transactions, including cash, check, credit card, and debit card, accept food stamps, place transactions on hold and recall, perform voids and returns at POS, access online credit card authorizations and capture electronic signatures, integrate debit and credit card processing, ensure optional credit card discounts with address verification, support mix-and-match pricing structure, discount entire sale or selected items at time of sale, add customer account, track customer information, including total sales, number of visits, and last visit date. issue store credit, receive payment(s) for individual invoices, process deposits on orders, search by customer's ship-to address, create and process layaway, back orders, work orders, and sales quotes, credit items sold to selected sales reps, view daily sales graph at the PoS, view and print journals from any register, preview, search, and print journals by register, batch, and/or receipt number, print X, Z, and ZZ reports, print receipts, invoices, and pick tickets with logos/graphics, print kit components on receipt, reprint receipts, enter employee hours with an integrated time clock function, and/or sell when the network/server is down with an offline PoS mode. Retail enterprise system 224 also may include inventory control and tracking capabilities, reporting tools, customer management capabilities, employee management tools, and may integrate with other accounting software.

In various embodiments cash register/retail enterprise system 224 may be a hospitality PoS. In such embodiments, retail enterprise system 224 may include hospitality PoS software (e.g., Aloha® PoS Restaurant software from NCR®, Micros® RES® and Symphony® software and the like), hospitality management software, and other hardware and software to facilitate hospitality operations.

Figure 3:
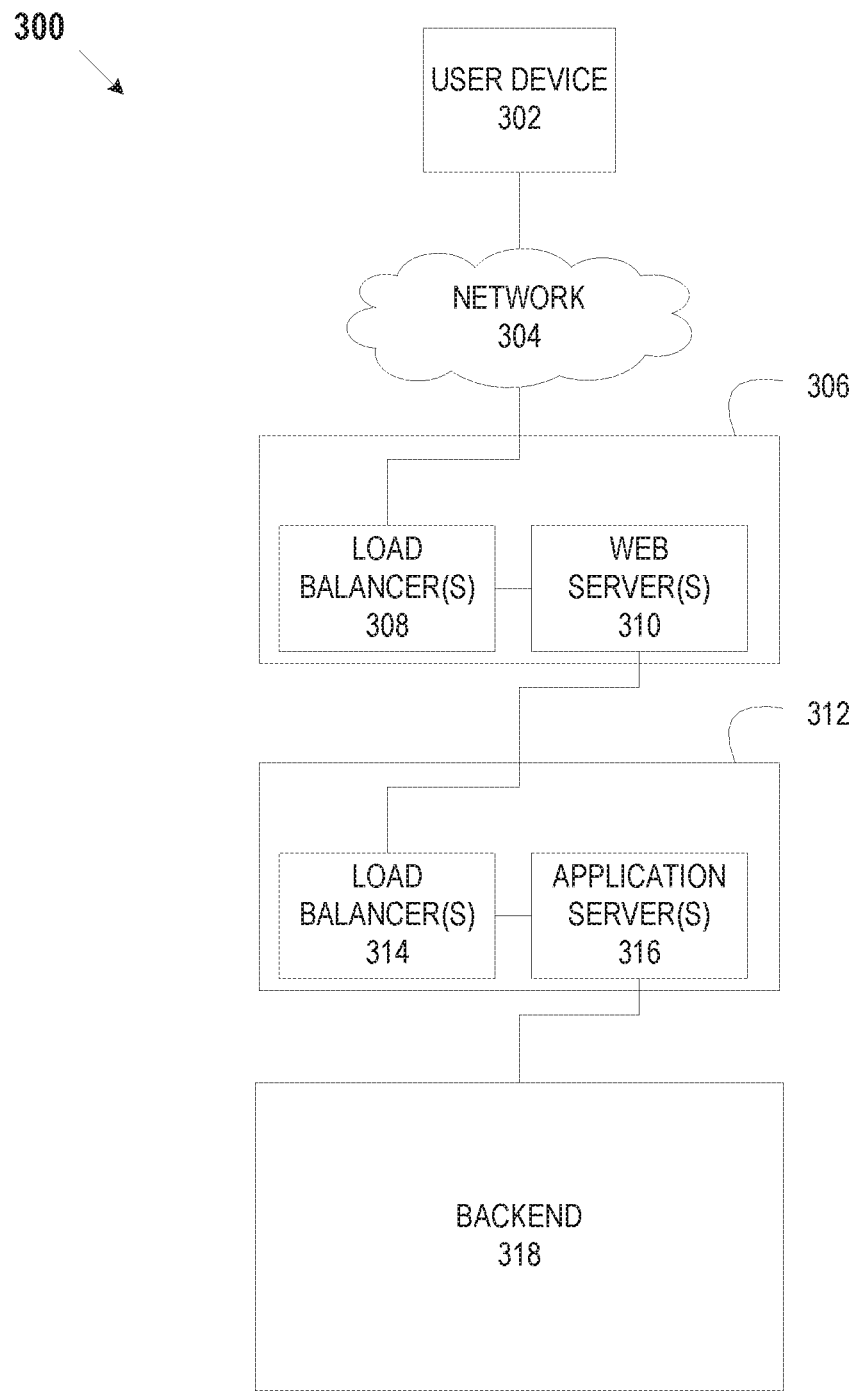
FIG. 3 depicts an example system and device to generate a user customized order interface, according to embodiments of the disclosure.

Referring to FIG. 3, system 300 may include a system and device to generate a user customized order interface which may be utilized for ordering and payment of transactions. For example, system 300 may include a user device 302, which may be similar to mobile device 120, a network 304, which may be similar to network 110, a front-end controlled domain 306, a back-end controlled domain 312, and a backend system 318. Front-end controlled domain 306 may include one or more load balancers 308 and one or more web servers 310. Back-end controlled domain 312 may include one or more load balancers 314 and one or more application servers 316.

User device 302 may be a network-enabled computer. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 300 may execute one or more software applications to enable, for example, network communications.

User device 302 may include an iPhone®, iPod®, iPad®, and/or Apple Watch® from Apple® or any other mobile device running Apple's iOS® operating system, any device running Google's Android® operating system, including for example, Google's wearable device, Google Glass®, any device running Microsoft's Windows® Mobile operating system, and/or any other smartphone or like wearable mobile device.

Network 304 may be one or more of a wireless network, a wired network, or any combination of a wireless network and a wired network. For example, network 304 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 304 may include, without limitation, telephone lines, fiber optics, IEEE Ethernet 902.3, a wide area network (WAN), a local area network (LAN) or a global network such as the Internet. Also, network 304 may support an Internet network, a wireless communication network, a cellular network, or the like, or any combination thereof. Network 404 may further include one network, or any number of example types of networks mentioned above, operating as a stand-alone network or in cooperation with each other. Network 304 may utilize one or more protocols of one or more network elements to which they are communicatively couples. Network 304 may translate to or from other protocols to one or more protocols of network devices. Although network 304 is depicted as a single network, it should be appreciated that according to one or more embodiments, network 304 may comprise a plurality of interconnected networks, such as, for example, the Internet, a service provider's network, a cable television network, corporate networks, and home networks.

Front-end controlled domain 306 may be implemented to provide security for backend 318. Load balancer(s) 308 may distribute workloads across multiple computing resources, such as, for example computers, a computer cluster, network links, central processing units or disk drives. In various embodiments, load balancer(s) 310 may distribute workloads across, for example, web server(s) 316 and/or backend 318 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 308 may include software that monitoring the port where external clients, such as, for example, user device 302, connect to access various services of a financial institution, for example. Load balancer(s) 308 may forward requests to one of the application servers 316 and/or backend 318 servers, which may then reply to load balancer 308. This may allow load balancer(s) 308 to reply to user device 302 without user device 302 ever knowing about the internal separation of functions. It also may prevent mobile devices from contacting backend servers directly, which may have security benefits by hiding the structure of the internal network and preventing attacks on backend 318 or unrelated services running on other ports, for example.

A variety of scheduling algorithms may be used by load balancer(s) 308 to determine which backend server to send a request to. Simple algorithms may include, for example, random choice or round robin. Load balancers 308 also may account for additional factors, such as a server's reported load, recent response times, up/down status (determined by a monitoring poll of some kind), number of active connections, geographic location, capabilities, or how much traffic it has recently been assigned.

Load balancers 308 may be implemented in hardware and/or software. Load balancer(s) 308 may implement numerous features, including, without limitation: asymmetric loading; Priority activation: SSL Offload and Acceleration; Distributed Denial of Service (DDoS) attack protection; HTTP/HTTPS compression; TCP offloading; TCP buffering; direct server return; health checking; HTTP/HTTPS caching; content filtering; HTTP/HTTPS security; priority queuing; rate shaping; content-aware switching; client authentication; programmatic traffic manipulation; firewall; intrusion prevention systems.

Web server(s) 310 may include hardware (e.g., one or more computers) and/or software (e.g., one or more applications) that deliver web content that can be accessed by, for example a client device (e.g., user device 302) through a network (e.g., network 304), such as the Internet. In various examples, web servers, may deliver web pages, relating to, for example, online banking applications and the like, to clients (e.g., user device 302). Web server(s) 310 may use, for example, a hypertext transfer protocol (HTTP/HTTPS or sHTTP) to communicate with user device 302. The web pages delivered to user device may include, for example, HTML documents, which may include images, style sheets and scripts in addition to text content.

A user agent, such as, for example, a web browser, web crawler, or native mobile application, may initiate communication by making a request for a specific resource using HTTP/HTTPS and web server 310 may respond with the content of that resource or an error message if unable to do so. The resource may be, for example a file on stored on backend 318. Web server(s) 310 also may enable or facilitate receiving content from user device 302 so user device 302 may be able to, for example, submit web forms, including uploading of files.

Web server(s) also may support server-side scripting using, for example, Active Server Pages (ASP), PHP, or other scripting languages. Accordingly, the behavior of web server(s) 310 can be scripted in separate files, while the actual server software remains unchanged.

Load balancers 314 may be similar to load balancers 308 as described above.

Application server(s) 316 may include hardware and/or software that is dedicated to the efficient execution of procedures (e.g., programs, routines, scripts) for supporting its applied applications. Application server(s) 316 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 316 may act as a set of components accessible to, for example, a financial institution, or other entity implementing system 400, through an API defined by the platform itself. For Web applications, these components may be performed in, for example, the same running environment as web server(s) 310, and application servers 316 may support the construction of dynamic pages. Application server(s) 316 also may implement services, such as, for example, clustering, fail-over, and load-balancing. In various embodiments, where application server(s) 316 are Java application servers, the web server(s) 316 may behaves like an extended virtual machine for running applications, transparently handling connections to databases associated with backend 318 on one side, and, connections to the Web client (e.g., user device 302) on the other.

Backend 318 may include hardware and/or software that enables the backend services of, for example, a financial institution, merchant, or other entity that maintains a distributed system similar to system 300. For example, backend 318 may include, a system of record, online banking applications, encryption applications, BLE/Bluetooth connection platforms, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and/or a location system, which may include additional capabilities, such as transaction card data generation, transaction processing, and/or transmission of account and/or transaction data. Backend 318 may be associated with various databases, including account databases that maintain, for example, cardholder information (e.g., demographic data, credit data, cardholder profile data, and the like), transaction card databases that maintain transaction card data (e.g., transaction history, account balance, spending limit, budget categories, budget spending, budget limits, and the like), connection information (e.g., public/private key pairs, UUIDs, device identifiers, and the like) and the like. Backend 318 also may be associated with one or more servers that enable the various services provided by system 300. Backend 318 may enable a financial institution to implement various functions associated with reprogramming a transaction card and/or providing data to a transaction card in order to facilitate the connection of a first device to a second device as described herein.

Figure 4:
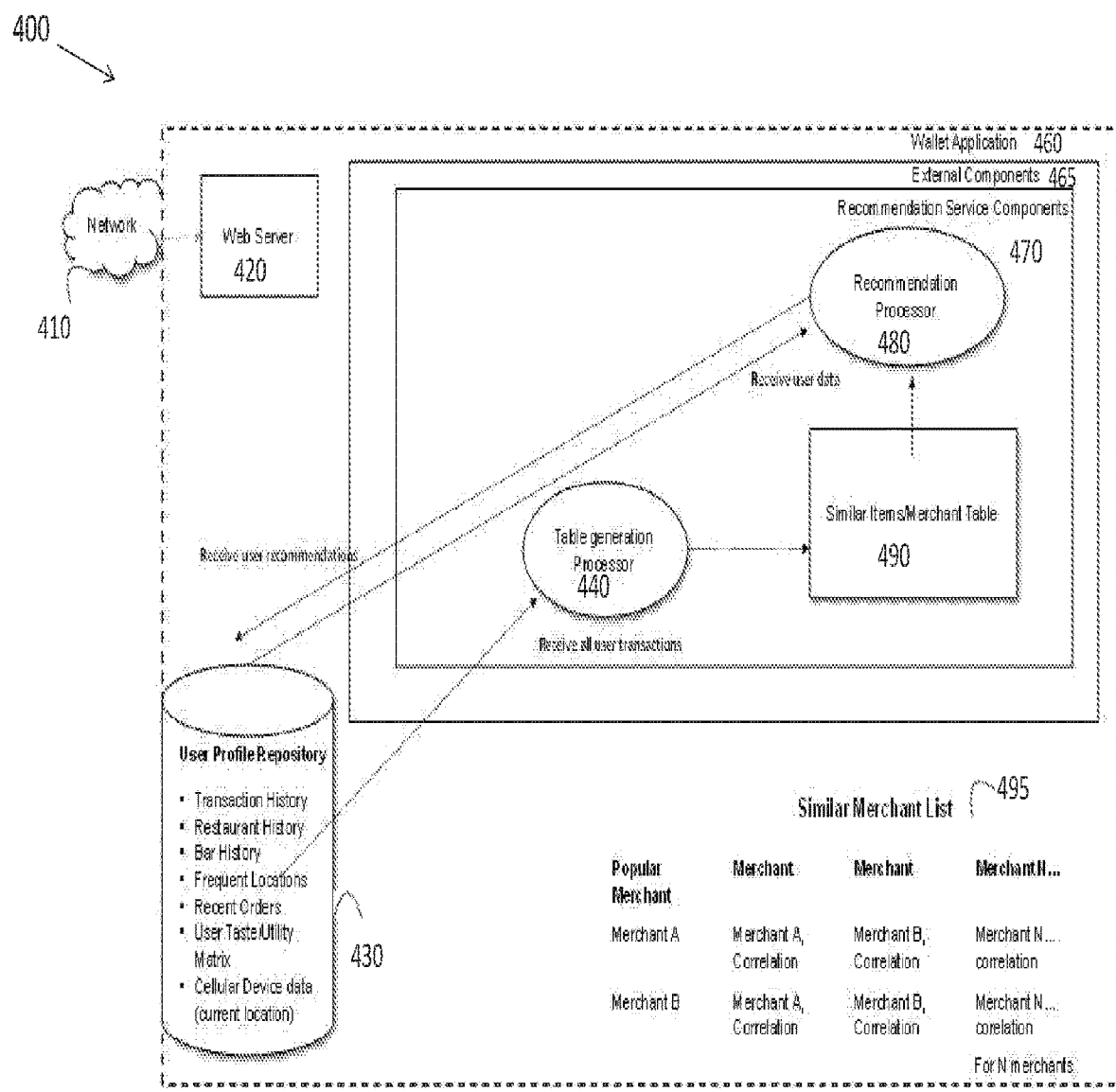
FIG. 4 depicts an example smart shopping system for generating a user customized order interface that may be utilized for ordering and payment, according to embodiments of the disclosure.

FIG. 4 depicts an example smart shopping system 400 for generating a user customized order interface that may be utilized for ordering and payment, according to embodiments of the disclosure, which may include network 410, webserver 420, user profile repository 430, table generation processor 440, recommendation processor 480, mobile wallet application 460, external components 465, recommendation service components 470, similar items/merchant table 490, and similar merchant list 495. Table generation processor 440 may receive user transaction information from user profile repository 430, which may be utilized by table generation processor to generate similar items/merchant table 490 and similar merchant list 495. Recommendation processor 480 may receive user data from user profile repository 430 and similar items/merchant table 490, and recommendation processor 480 may generate user recommendations which may be stored in user profile repository 430.

Figure 5:
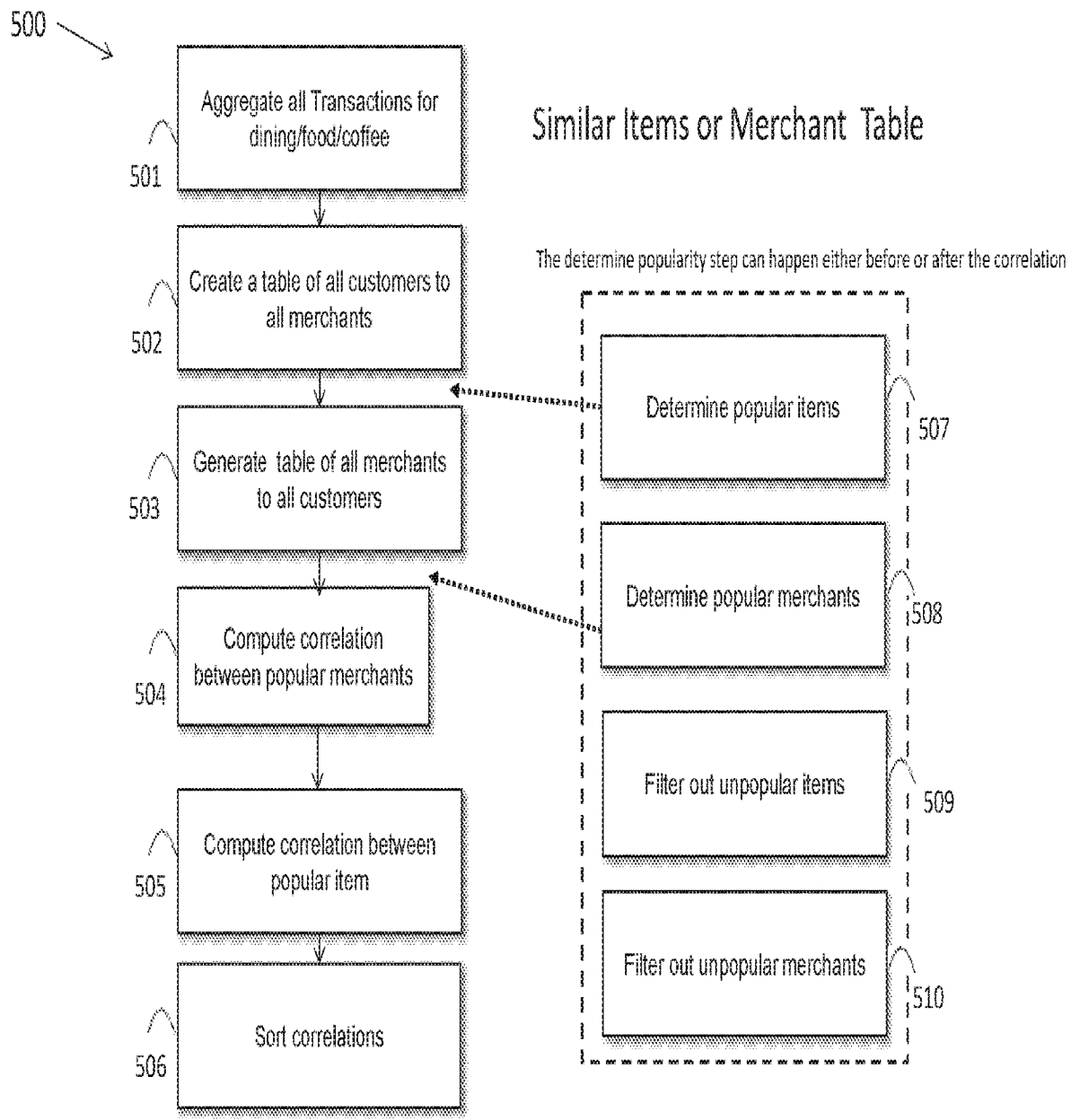
FIG. 5 depicts an example method for generating a smart shopping similar items or merchant table, according to embodiments of the disclosure.

FIG. 5 depicts an example method 500 for generating a smart shopping similar items or merchant table, according to embodiments of the disclosure. At block 501, the smart shopping system may aggregate all transactions for a particular shopping experience, such as dining, food, coffee. At block 502, the smart shopping system may generate a table of all customers to all merchants. At block 503, the smart shopping system may generate a table of all merchants to all customers. At block 504, the system may computer a correlation between popular merchants, and at block 505, the system may compute a correlation between popular items. At block 506, the system may sort the system generated correlations. A popularity calculation may be utilized to generate the similar items or merchant table. This calculation may be completed before or after the correlation processing and may include determining popular items (block 507), determining popular merchants (block 508), filtering out unpopular items (509), and filtering out unpopular merchants (block 510).

Figure 6:
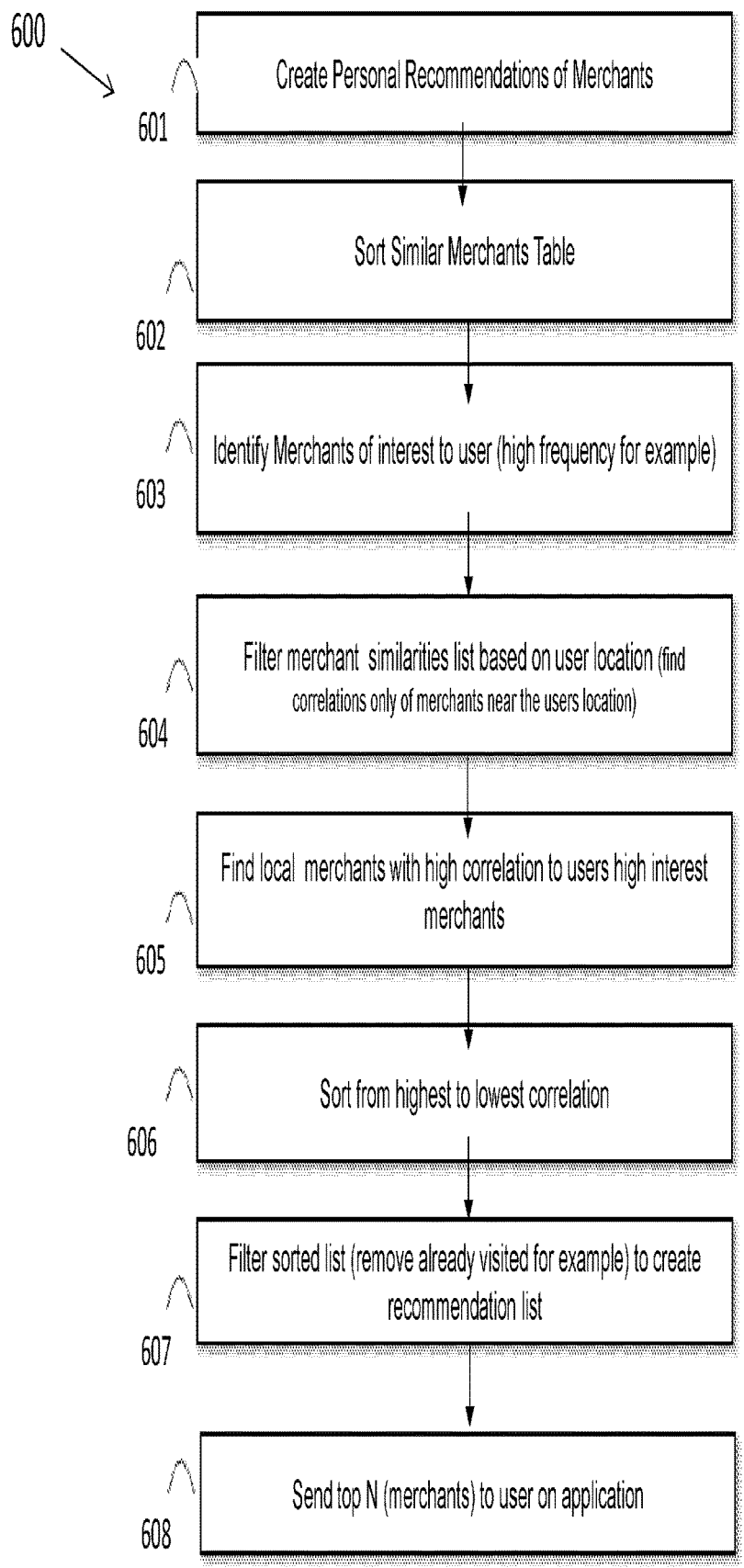
FIG. 6 depicts an example method for generating a smart shopping similar items or merchant table, according to embodiments of the disclosure.

FIG. 6 depicts an example method 600 for generating and utilizing a smart shopping similar items or merchant table, according to embodiments of the disclosure. At block 601, the system may create personal recommendations of merchants. At block 602, a similar merchants table may be sorted to identify particular merchants of interest to a user, at block 603. At block 604, the merchant similarities list may be filtered based on user location, and this filtered list may be utilized by the system at block 605 to find local merchants with a correlation to users as high interest merchants. The similar merchants table may be sorted based on correlation at block 606. For example, the table may be sorted from highest to lowest correlation. The sorted list may be filtered at block 607 to create a recommendation list. For example, merchants that a user has already visited may be removed from the list. The system may transmit a top number of merchants to a user via a user application, which may be located on a user device, at block 608.

Figure 7:
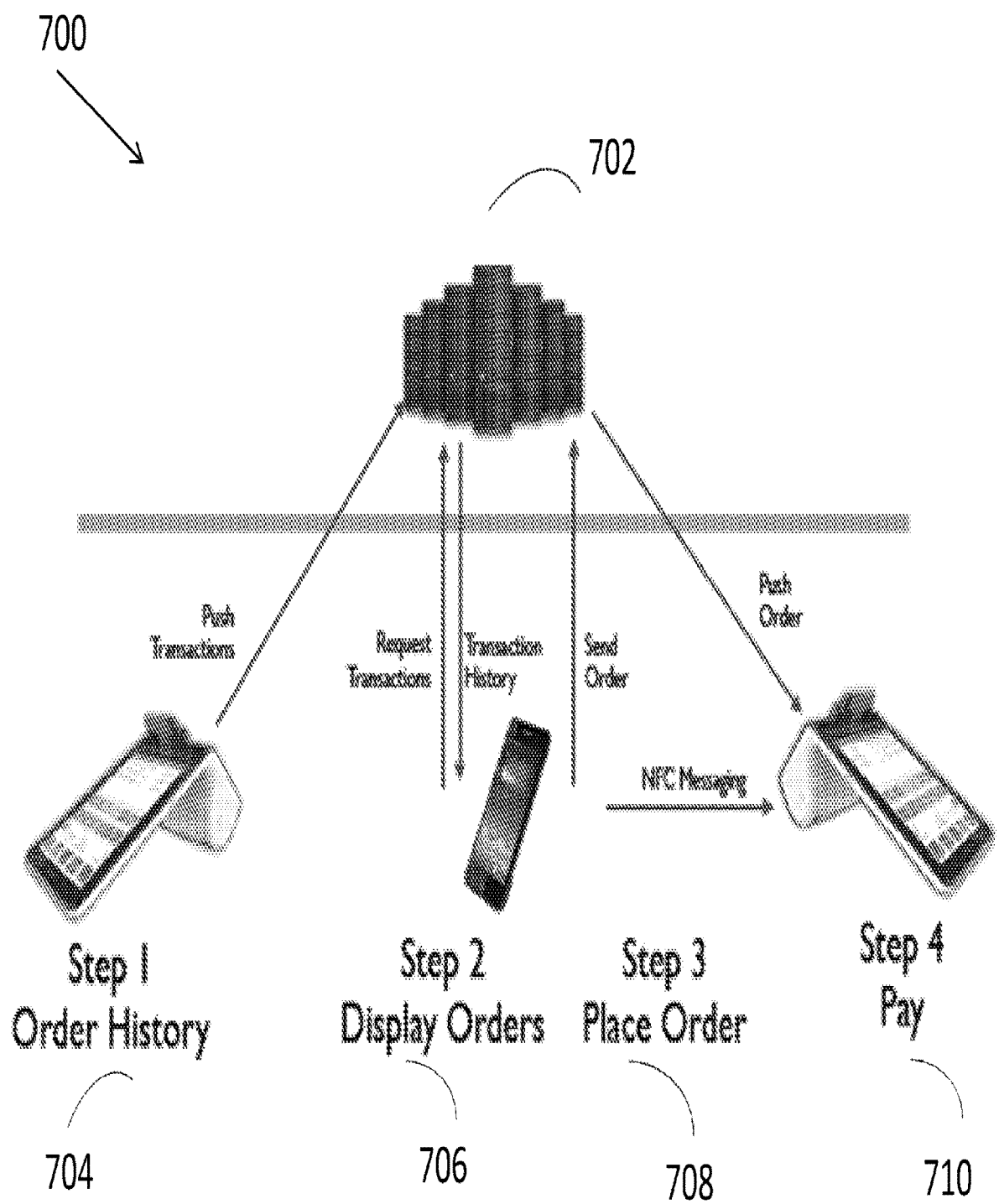
FIG. 7 depicts an example system architecture of a system for generating a user customized order interface that may be utilized for ordering and payment, according to embodiments of the disclosure.

FIG. 7 illustrates an example system architecture of an open, distributed system for generating a user customized order interface that may be utilized for ordering and payment across various merchants. A customer's mobile device 120 may communicate with a merchant system 130 via mobile application 124. Associated messaging and payment processing may be preceded by WiFi/https messaging, which may be illustrated for example in FIGS. 28-31. Mobile device 120 may utilize location-tracking systems and methods, such as GPS, to determine the current location of the customer's mobile device. Upon determining the current location of the customer's mobile device, mobile application 124 may send the current location to transaction system 152 via network 110. Transaction system 152 may compare the current location of the customer's mobile device to merchant locations identified in data storage 154. Upon determining a match between the current location of the customer's mobile device and a merchant location identified in data storage 154, transaction system 152 may send a message to merchant system 130 via mobile application 124, utilizing push transactions 704 and a mobile application SDK, and may request the corresponding merchant ID of the identified merchant location associated with the customer's current location.

In response to the message, PoS terminal 132 may pass the corresponding merchant ID to transaction system 152, which may retrieve past transactions and corresponding transaction IDs associated with the merchant ID. Transaction system 152 may send the transaction IDs to merchant system 130 via mobile application 124, and may request specific order information associated with the transmitted transaction IDs 702. Merchant system 130 may retrieve the requested specific order information by utilizing the transaction IDs. Additionally, along with the transaction IDs, transaction system 152 may also send additional transaction information, which may include corresponding transaction amounts and timestamps. The specific order information may include the individual items included in the transaction, and may additionally include SKU level inventory information. The specific order information may also include specific details of the individual items. For example, for a transaction that occurred in a coffee shop, the specific order information may include the flavor of a purchased drink, the associated type of milk, whether sugar or a sugar substitute was requested, whether the item was gluten-free, whether there were any special requests, etc.

Figure 9:
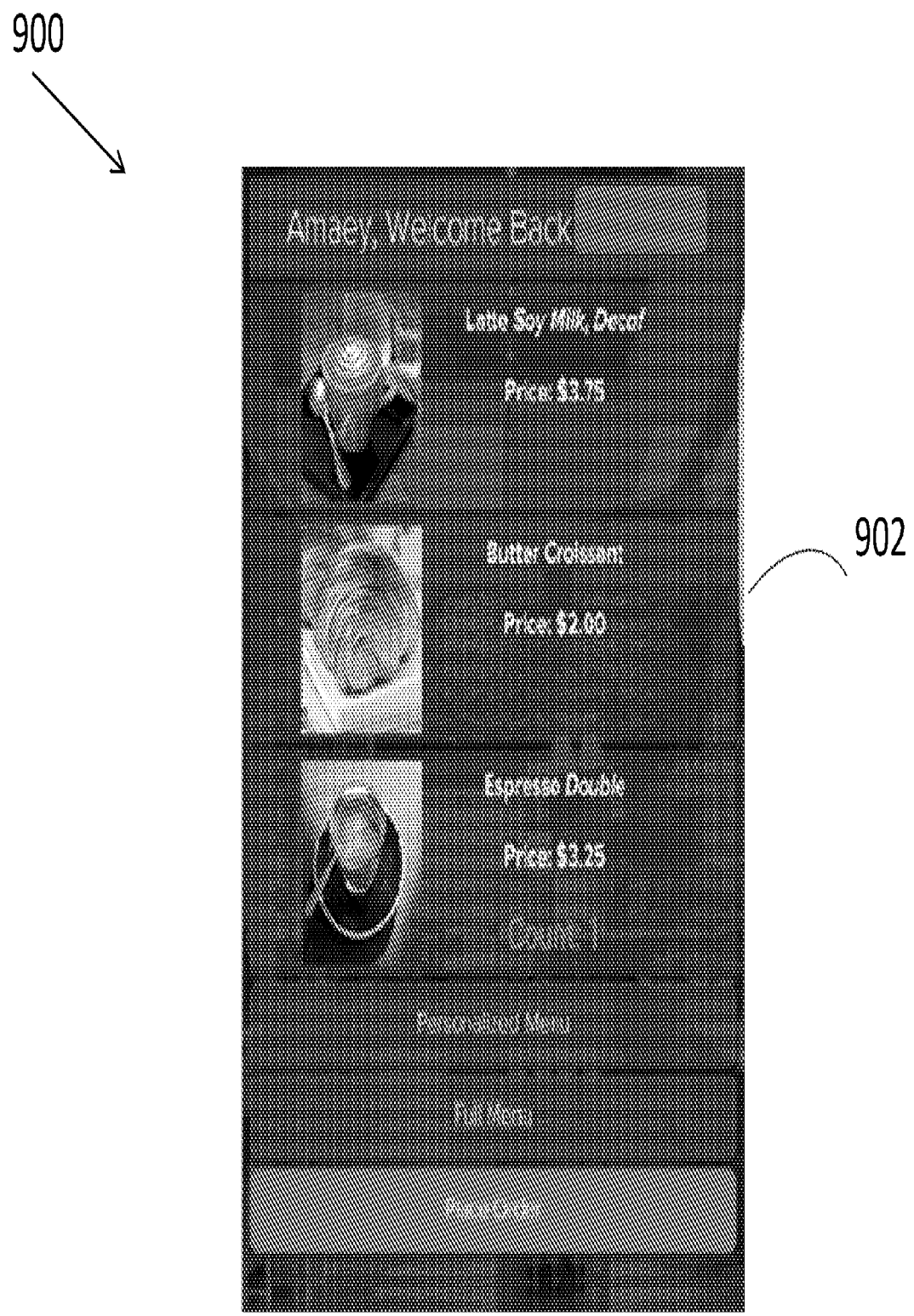
FIG. 9 depicts an example user customized order interface on a mobile device, according to embodiments of the disclosure.

Upon receipt of the specific order information, transaction system may store the specific order information in data storage 154, and may generate via mobile application 124 a user customized order interface, which displays the customer's previous orders and corresponding specific order information 706. Using the generated customized interface, an example of which is illustrated by FIG. 9, a customer may select a specific order item to order/re-order, and may utilize mobile application to confirm the order and proceed to payment, which will transmit the order to merchant system 708. Merchant system may push the order to PoS terminal 710 for the customer to view and to complete the order by making payment using cash, a credit or debit card, a smart or EMV card, and/or NFC or Bluetooth technology, etc. Additionally, customer may utilize mobile application 124 to complete payment utilizing an account associated with the mobile application.

Figure 8:
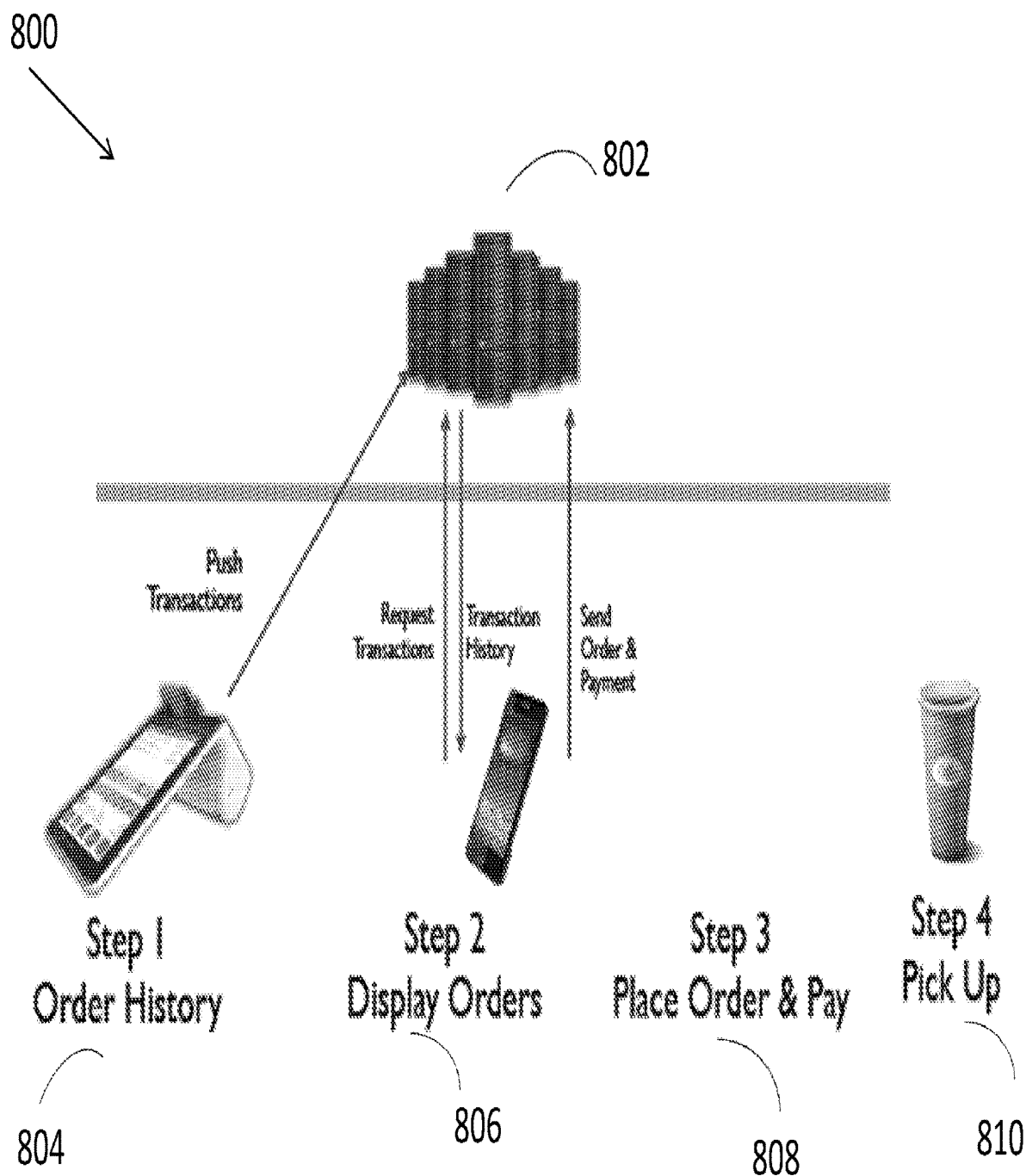
FIG. 8 depicts an example system architecture of a system for generating a user customized order interface that may be utilized for pre-ordering and payment, according to embodiments of the disclosure.

FIG. 8 illustrates an example system architecture of an open, distributed system for generating a user customized order interface that may be utilized for pre-ordering and payment across various merchants. A customer's mobile device 120 may communicate with a merchant system 130 via mobile application 124. Mobile device 120 may utilize location-tracking systems and methods, such as GPS, to determine the current location of the customer's mobile device. Upon determining the current location of the customer's mobile device, mobile application 124 may send the current location to transaction system 152 via network 110. Transaction system 152 may compare the current location of the customer's mobile device to merchant locations identified in data storage 154. Upon determining a match between the current location of the customer's mobile device and a merchant location identified in data storage 154, transaction system 152 may send a message to merchant system 130 via mobile application 124, utilizing push transactions 804, and may request the corresponding merchant ID of the identified merchant location associated with the customer's current location.

In response to the message, PoS terminal 132 may pass the corresponding merchant ID to transaction system 152, which may retrieve past transactions and corresponding transaction IDs associated with the merchant ID. Transaction system 152 may send the transaction IDs to merchant system 130 via mobile application 124, and may request specific order information associated with the transmitted transaction IDs 802. Merchant system 130 may retrieve the requested specific order information by utilizing the transaction IDs. Additionally, along with the transaction IDs, transaction system 152 may also send additional transaction information, which may include corresponding transaction amounts and timestamps. The specific order information may include the individual items included in the transaction, and may additionally include SKU level inventory information. The specific order information may also include specific details of the individual items. For example, for a transaction that occurred in a coffee shop, the specific order information may include the flavor of a purchased drink, the associated type of milk, whether sugar or a sugar substitute was requested, whether the item was gluten-free, whether there were any special requests, etc.

Upon receipt of the specific order information pertaining to a customer's previous orders, transaction system may store the specific order information in data storage 154, and may generate via mobile application 124 a user customized order interface, which displays the customer's previous orders and corresponding specific order information 506. Using the generated customized order interface, an example of which is illustrated by FIG. 6, a customer may select a specific order item to pre-order, and may utilize mobile application to confirm the order and proceed to payment, which will transmit the order to merchant system 808. Customer may utilize mobile application 124 to complete payment utilizing an account associated with the mobile application, and may pick up the pre-order 810 at the merchant location.

The smart shopping system may also be utilized by a user to make reservations for various merchants, including restaurants and hotels, as well as to make call ahead reservations.

FIG. 9 depicts an example user customized order interface 900 on a mobile device. The user customized order interface may display a personalized menu for a particular merchant location 902, which may include the customer's previous orders and corresponding specific order information, which may be stored in account provider system data storage 150 for a particular merchant ID. For example, for a transaction that occurred in a coffee shop, the specific order information may include the type of item ordered (e.g., latte, butter croissant, espresso, etc.) flavor of a purchased drink (e.g., vanilla, mocha, pumpkin spike, etc.), the associated type of milk (e.g., skim, whole, soy, almond, etc.), whether sugar or a sugar substitute was requested, whether the item was gluten-free, whether there were any special requests (e.g., double shot, extra hot, etc.). Upon generating the personalized menu, the merchant data may be updated in real time. Transaction system 152 may retrieve the merchant data from merchant system 130 in real time to assess the availability of personalized menu items. The user customized order interface may display personalized menu items that are currently available.

The user customized order interface may also display a full menu for a particular merchant location. Mobile application 124 may retrieve the merchant data associated with the full menu from merchant system 130 in real time. The merchant data associated with the full menu may be stored in data storage 136. Upon generating the user customized order interface, the merchant data associated with the full menu may be updated in real time.

A customer may utilize the generated user customized order interface to select a specific order item to order and place the order, which may transmit the order to merchant system. A customer may select an item to order from the personalized or full menu. Additionally, a customer may make modifications and special requests with respect to the particular order items by utilizing the user customized order interface.

Figure 10:
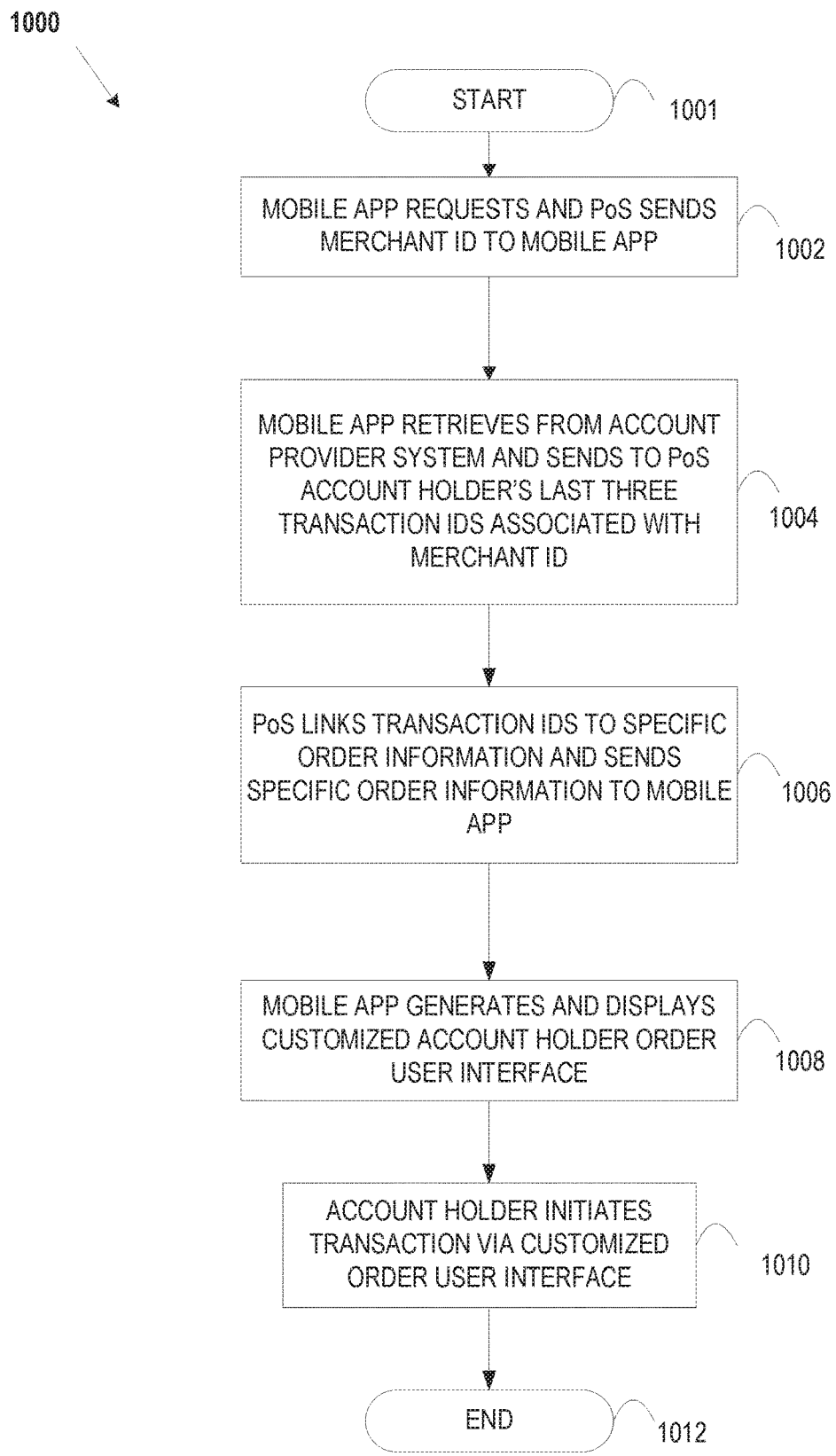
FIG. 10 depicts an example method for generating a user customized order interface based on past orders that may be utilized for ordering and payment, according to embodiments of the disclosure.

FIG. 10 illustrates an example method of generating a user customized order interface that may be utilized for ordering and payment across various merchants. The process 1000 may begin at block 1001. At block 1002, a mobile application 124 on a customer's mobile device 120 may request a merchant ID of a particular merchant by sending a message to merchant system 130. Mobile application 124 may request a merchant ID upon determination by mobile device 120 that a customer is within a close proximity of a particular merchant location utilizing GPS and WiFi based geo-fencing technologies (NFC technologies may also be utilized), which may combine awareness of a user's current location with awareness of a user's proximity to locations. Mobile device may utilize location-tracking systems and methods, such as geo-fencing technologies, to determine the current location of the customer's mobile device, and to generate real time location based notifications. To mark a location of interest, you specify its latitude and longitude. To adjust the proximity for the location, you add a radius. The latitude, longitude, and radius define a geo-fence, creating a circular area, or fence, around the location of interest. Geo-fence objects, transitions, and triggers may be utilized. Mobile device may also utilize Bluetooth and NFC technologies associated with a PoS to determine whether a customer is within a close proximity of a merchant location. Upon determining that a customer is within a close proximity of a particular merchant location, mobile application 124 may automatically send a message to merchant system 130 requesting the associated merchant ID. Upon determining that a customer is within a close proximity of a particular merchant location, a message may be transmitted to mobile device 120 via a push notification through mobile application 124 indicating that the customer is within a close proximity of a particular merchant location. Upon receipt of this message, mobile application 124 may automatically send a message to merchant system 130 requesting the associated merchant ID. A customer may also be prompted via mobile application 124 to respond whether the customer would like the merchant ID to be requested. Additionally, regardless of a customer's location, a customer may open mobile application 124 on a mobile device, and may select a particular product or merchant to request an associated merchant ID.

At block 1004, in response to the message, PoS terminal 132 may utilize a terminal ID to pass the corresponding merchant ID to transaction system 152, which may retrieve, for example, the customer's last three transactions and corresponding transaction IDs associated with the merchant ID, which may be stored in data storage 154. The transaction information stored in data storage 154 may also include corresponding transaction amounts and timestamps of the transaction associated with the individual transaction IDs. Transaction system 152 may send the transaction IDs to merchant system 130 via mobile application 124, and may request specific order information associated with the transmitted transaction IDs.

At block 1006, merchant system 130 may link the transaction IDs to specific order information. Additionally, along with the transaction IDs, transaction system 152 may also send additional transaction information, which may include corresponding transaction amounts and timestamps. The specific order information may include the individual items included in the transaction, and may additionally include SKU level inventory information. The specific order information may also include specific details of the individual items. For example, for a transaction that occurred in a coffee shop, the specific order information may include the flavor of a purchased drink, the associated type of milk, whether sugar or a sugar substitute was requested, whether the item was gluten-free, whether there were any special requests, etc.

Merchant system 130 may send the specific order information to mobile application 124. At block 1008, upon receipt of the specific order information, transaction system may store the specific order information in data storage 154, and may generate via mobile application 124 a user customized order interface, which displays the customer's previous orders and corresponding specific order information.

At block 1010, using the generated customized interface, an example of which is illustrated by FIG. 9, a customer may initiate a transaction by selecting a specific order item to order, which may generate an order ID, and may utilize mobile application 124 to confirm the order and proceed to payment, which will transmit the order to merchant system in real time. The order ID may be associated with a terminal token. The system may confirm a user's location over a wireless connection, which may include Bluetooth or BLE, by evaluating a unique Order ID-terminal token pair. The system may add the order to an order queue. Upon confirming payment, the system may generate a payment token that may be utilized for payment verification and facilitate payment. The process 1000 may end at block 1012.

Transaction system 152 may utilize a customer's transaction data and specific order information to generate recommendations for a customer based on a customer's past transactions. The recommendation algorithm may be incorporated as part of the mobile application and the generated recommendations may be incorporated into the generated user profile.

Upon generation of the recommendations, transaction system may store the recommendations and associated order information in data storage 154, and may generate a customer profile. The customer profile may include customer preferences associated with particular merchants and particular merchant types. For example, for a particular coffee shop merchant location, the customer profile may include customer preferences such as flavor, type of milk, whether sugar or a sugar substitute is preferred, whether gluten-free items are preferred, etc. If a customer orders pumpkin spice lattes in October, transaction system 152 may recommend other holiday specialty drinks to the customer throughout the year.

User profiles may be stored locally in the mobile application. However user profiles may also be stored within an external data server. The smart shopping system may create a similarity table that takes the entirety of transaction data in order to create a data repository, which may include a database, of recommendations using correlation between items or merchants and transaction volume. Due to processing requirements, this process may include an offline system, external to the mobile application.

Table generation may occur periodically offline on a system external to the mobile application. The table generation may create a sorted table or ranking that can be fed to a user as a list of either restaurants or items to consider. There are a variety of tables to generate the following example of methods:

Collaborative filtering. Generally using collective user data to find likelihood and correlations between items and/or merchants.

Content filtering: creating tags for items or restaurants and comparing it to a specific user's preferences/taste held within their profile Popularity: Finding and ranking the most popular merchants or items across transaction data (can be done by reviews or volume of transactions)

Spend: A list curated by the average amount of spend at a particular merchant

Segmentation: Creating a k-means cluster of users and their preferences and visited restaurants. To be used for comparison.

The table may then later be fed to the user's mobile device with contextual information from the user's cellular device and mobile application to provide instant recommendations. User profiles may first consist of a merchant history of a consumer where access is limited for an individual customer's SKU level data. As system use increases, the system may be able to create more robust user profiles. User profiles may be sent to a recommendation system in order to generate individualized recommendations for a user when using the system. The system may build the user profile from terminal, which may include a smart terminal, mobile wallet and pre-order receipts tied to individual transactions.

User profiles may be generated locally, and may be updated in real time. User profiles may be generated from an issuer system's wealth of transaction data. User profiles may first consist of the merchant history of a consumer where access is limited for an individual customer's SKU level data. As system use increases, more robust user profiles may be created. User profiles may be sent to a recommendation system in order to generate individualized recommendations for a user.

The recommendation system may include a recommendation engine that may create a list of the user's transaction history, may filter for only transactions in a particular merchant category, such as the dining categories, may sort by date of transaction, and may sends user the merchant information of the, for example, most recent places they purchased.

The recommendation engine may create a list of the users transactions, and may filter the user transactions for a particular merchant category, such as the dining category. The recommendation engine may determine the highest frequency merchants by counting the number of times a specific merchant appears in the users transaction list, and may sort and attempt to identify a range of times the user goes to that specific dining location. The recommendation engine may then send the user the time range and merchant for the, for example, top visited places. The recommendation engine may utilize a variety of methods to determine the time range of the associated transactions and recommendations.

Transaction system may utilize the generated recommendations across various merchants. For example, if a customer profile is generated for a particular coffee shop, a customized menu may be generated for a different coffee shop utilizing the customer profile user preferences. Additionally, transaction system may generate recommendations based on popular items associated with a particular merchant. A customer may utilize mobile application 124 to modify the generated customer profile, which may be stored in data storage 154. A customer may also utilize user permissions to specify which transaction data and specific order information may be utilized, stored and transmitted by the system. Transaction system 152 may utilize the customer profile to generate the user customized order interface, which may display the system generated recommendations. Using the generated customized interface, a customer may initiate a transaction by selecting a specific recommended item to order, and may utilize mobile application 124 to confirm the order and proceed to payment, which will transmit the order to merchant system.

The recommendation system may include an external system that generates recommendations in real time. The recommendation process will take inputs from a Similar Items Table as well as the User profiles to generate recommendations that are then sent to the mobile wallet application. For example, for food and dining, the system may make: itemized recommendations (what someone should order) or merchant recommendations (where someone should order from).

For item recommendations, the recommendation system may identify the user's location (either current or a specified location). The recommendation system may filter restaurants near the location and aggregates a list of the items offered by each restaurant in the list. The recommendation system may input a user profile for frequent orders (orders that reach a certain frequency threshold for the user), previous orders: Orders recently made, and things a user may like by utilizing a similarity table rank order the items with high correlation to users most frequent purchases and filtering out purchases they have made previously.

For merchant recommendations, the recommendation system is fed a user location, and filters merchants near the specified location. The recommendation system may input a user profile for Frequent merchants (merchants the user visits often that reach a certain frequency threshold for the user), previous orders (the last three merchants they visited), things they may like, using a similarity table rank order the filtered list of merchants by correlation to the user's most visited merchants, filter out restaurants they have previously made a transaction at, and using a popularity list, the system may rank the order of the filtered list of merchants by popularity and filter out merchants visited by the user.

The recommendation table may be generated based on data regarding the stores customers spend at most frequently, their average spend amount, and their categorical spend and more, as well as data from third party provider systems for detailed merchant information including location, longitude latitude and category information.

Figure 11:
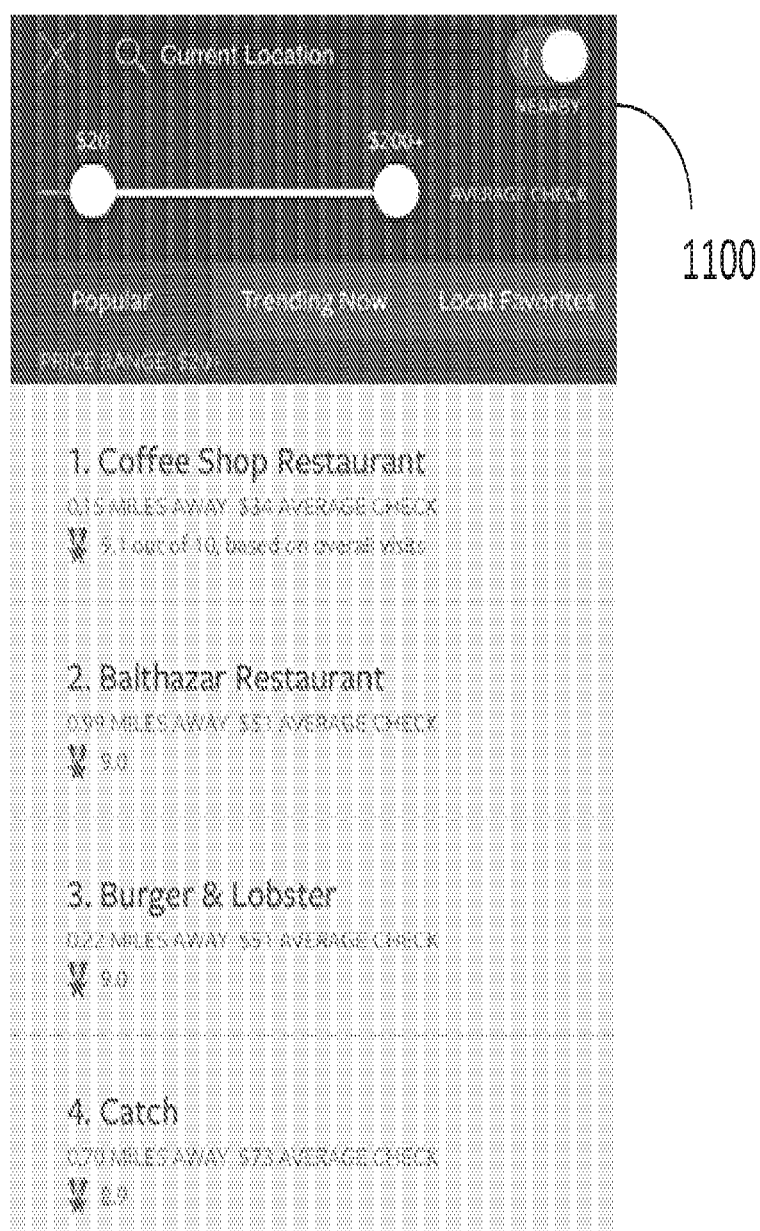
FIGS. 11-12 depict an example recommendation system, according to embodiments of the disclosure.

The recommendation system may make recommendations based on an average approach based on averages across data sources. Additionally the system may utilize filters on the data. The recommendation system may make recommendations based on ratings and transaction frequency filtered by the location, which may include collaborative recommendations. Filters may be utilized on data to add context to consumers and make recommendations more relevant. The number of filters can vary and may include the following. Using a GPS system, a user location may be identified. Using a merchant database, the system may filter a list of merchants within a particular distance of the customer's location. Using the filtered list, the system can order the restaurants based on volume of transactions historically (i.e., how many consumers have visited the restaurant recently). Or if consumers have publically rated a restaurant the system may rank restaurants in order based on highest rating. There are a variety of filters that can be added to populate the list of recommendations. And filters can be combined to populate more relevant lists for a customer. Other restaurant filters can include average spend at a merchant, list of stores where the volume is up, and stores where the average spend is decreasing. In each the above methods a list is generated typically with some ranking, which may include, for example, recommending stores based on transaction volume at the store is shown in FIG. 11, which depicts an example user customized recommendation interface 1100, which may be generated on a mobile device.

Figure 12:
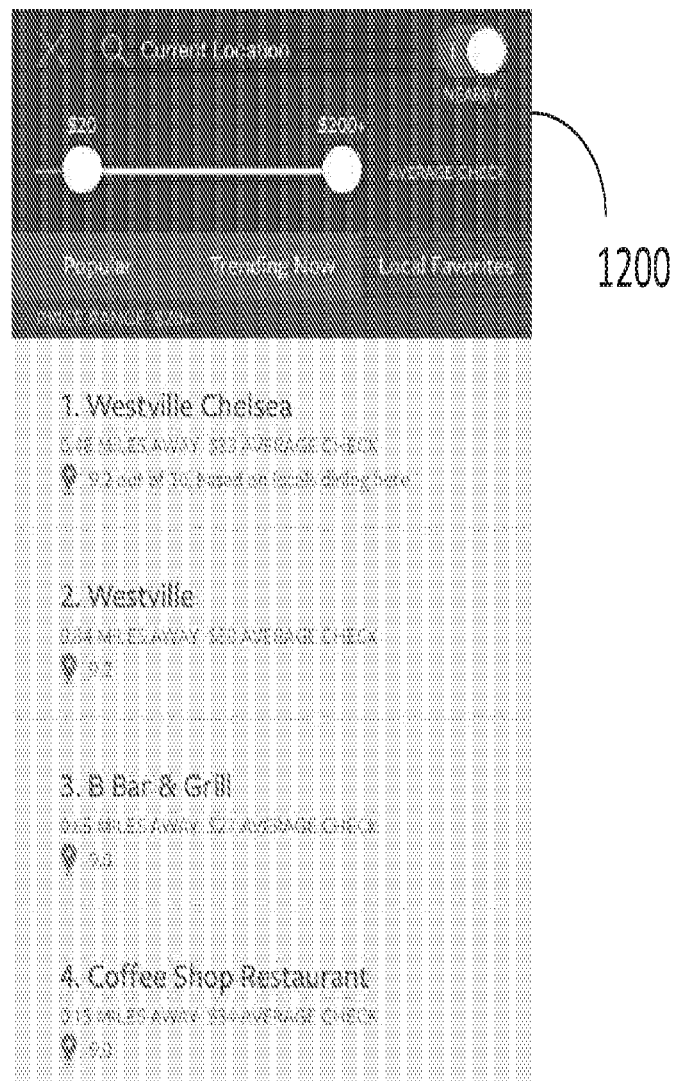

Recommending stores based on ratings and transaction frequency filtered by the location is shown in FIG. 12, which depicts an example user customized recommendation interface 1200, which may be generated on a mobile device.

The recommendation system may also utilize collaborative recommendations. Collaborative filtering may include a recommendation system that is used to make predictions (recommendations) for a single user based on the preferences or tastes of other users. Using a data repository of consumer transactions and merchant information, a variety of merchants may be compared to recommendations. Collaborative filtering may make the assumption that if person A has the same opinion as person B on an issue, person A would be more likely to have B's opinion on a different issue than a person at random. For instance, it may include the websites' person B also made purchases at, which may employ a similar technique for restaurant recommendations.

For example, for the entire transaction history of customers Amy, John, Jennifer, the system may filter their transactions by restaurant. For example, the transactions may be filtered by area code such that there may only be 3 restaurants within a predetermined geographic range of the user. The system may use the cosine distance for collaborative filtering. The system may assess if a customer made a transaction at a restaurant when they visited the restaurant. For example:

| Customer | Rest 1 | Rest 2 | Rest 3 |
|---|---|---|---|
| Amy | Visited | Didn't Visit | Visited |
| John | Didn't Visit | Visited | Visited |
| Jennifer | Didn't Visit | Visited | Didn't Visit |

The system may compare the cosines between each item to make recommendations:

$$\text{Similarity}(A, B) = \cos(A, B) = \frac{A \times B}{\|A\| \times \|B\|}$$

Between 1 & 2:

$$\frac{(1, 0, 1) \times (0, 1, 1)}{\|(1, 0, 0)\| \, \|0, 1, 1\|} = 0$$

Between 1 & 3:

$$\frac{(1, 0, 0) \times (1, 1, 0)}{\|(1, 0, 0)\| \, \|1, 1, 0\|} = 1/\sqrt{2}$$

Between 2 & 3:

$$\frac{(0, 1, 1) \times (1, 1, 0)}{\|(0, 1, 1)\| \, \|1, 1, 0\|} = 1/2$$

The system may store the cosine values locally on a consumer's mobile device. Items with the largest cosine may be the most similar and as such recommended. So if a customer recently visited restaurant 1, the system would recommend restaurant 3. If they visited restaurant 2, the system would recommend restaurant 3.

The system may develop additional collaborative filtering methods that will create utility profiles of consumer's preferences. For instance, gathering knowledge about a restaurant, such as is it local, does it have a bar, or does it offer vegan options, which knowledge may be compared to a user profile:

| Julia's Restaurants | Local | Bar | Vegan |
|---|---|---|---|
| Rest 1 | Yes | yes | no |
| Rest 2 | Yes | yes | no |
| Rest 3 | Yes | no | yes |

The profiles may be saved as vectors in a data repository. Vectors can be made to generate user profiles across a variety of categories, e.g. automobile service, restaurants, entertainment, etc. When customers access the recommendation section of the app, the user profile may be accessed in relation to the customer's location to create recommendations.

To create more personalized models and recommendations, a model based approach of data mining and machine learning algorithms may be used to compare users to predict future purchases. For example, each transaction may be an observation of a consumer's preference for a specific category of store. For instance, the restaurants the customer shops at may reveal some information about the customer's tastes. Taking the total restaurants visited by customers in a specific area, similarity may be found between customers by the number of restaurants they visit, the type, the frequency they visit specific restaurants, and general demographic information to develop models or algorithms to identify if users fit a certain cluster of similar users or segment customers by tastes and preferences. Then once a user has been identified, the recommendation engine may suggest to them restaurants visited by other users who fit the same model or cluster.

Transaction system 152 may also communicate with social networking system 140, and may associate a customer's transaction data and specific order information with a customer's social data. The customer's social data may include, without limitation, information about the customer's friends or associates, the customer's gender, age, relationship status, family members, interests, hobbies, social groups that the customer is a member of, entertainment preferences, political views, religious beliefs, favorite sports teams and geographic location. The customer social data may also include a user id and password corresponding the customer that allows transaction system 152 to access the customer's own profile at social networking system 140.

The association may be accomplished by comparing an identifier corresponding to the customer transaction data and specific order information with an identifier corresponding to the customer's social data. The identifier may be, for example, the customer's first and/or last name, an identification number, an email or physical address, etc. In embodiments, transaction system 152 may require the customer to provide the user id and password corresponding to the customer that allows the customer to access their profile at social network system 140. Transaction system 152 may compare the provided user id and password with the social network user id and password included in the customer social data. If the information matches, transaction system 152 may store the customer social data and customer transaction data and specific order information in data storage 154. Transaction system 152 may generate a customer identifier based on the customer social data and customer transaction data and specific order information. The customer identifier may be stored with the customer social data and customer transaction data and specific order information in data storage 154.

Transaction system 152 may utilize a customer's social data and customer transaction data and specific order information to generate recommendations for a customer based on past transactions of members of a customer's social network and a customer's past transactions. Upon generation of the recommendations, transaction system may store the recommendations and associated order information in data storage 154, and may generate via mobile application 124 a user customized order interface, which displays the generated recommendations and corresponding specific order information. Using the generated customized interface, a customer may initiate a transaction by selecting a specific order item to order based on the generated recommendations, and may utilize mobile application 124 to confirm the order and proceed to payment, which will transmit the order to merchant system.

Transaction system 152 may also utilize a customer's transaction data, specific order information, and social data to generate offers and rewards for a customer based on a customer's and members of a customer's social network's past transactions. The offers and rewards may be displayed and redeemed via mobile application 124.

This process may end at block 712.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It may be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It may be further understood by those within the art that if a specific number of an introduced claim recitation is intended, such an intent may be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It may be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" may be understood to include the possibilities of "A" or "B" or "A and B."

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. A distributed computer system comprising:
   one or more processors; and
   at least one memory storing computer code that when executed by the one or more processors causes the system to:
   determine first location information corresponding to a current location of a first user device;
   determine second location information corresponding to a current location of a second user device;
   transmit the first location information and the second location information to a transaction server, the transaction server being configured to:
      identify, based on the first location information, a first merchant within a predetermined proximity of the first user device;
      retrieve, from a data storage, first transaction data associated with a first plurality of past transactions between the first merchant and a first user of the first user device, the transaction server and the data storage comprising an open, distributed system architecture;
      identify, based on the second location information, a second merchant within a predetermined proximity of the second user device;
      retrieve, from a data storage, second transaction data associated with a second plurality of past transactions between the second merchant and a second user of the second user device;
      determine a correlation between first transaction data and second transaction data by determining a cosine distance between the first transaction data and the second transaction data; and
      when the correlation between the first transaction data and the second transaction data exceeds a predetermined threshold:
         generate a first user order interface for the first user device, the first user order interface comprising a first recommendation to make a first purchase at the second merchant; and
         generate a second user order interface for the second user device, the second user order interface comprising a second recommendation to make a second purchase at the first merchant;
      when the correlation between the first transaction data and the second transaction data does not exceed the predetermined threshold:
         generate the first user order interface, the first user order interface comprising first order information for each of the first plurality of past transactions and one or more first items to order based on the first plurality of past transactions; and
         generate the second user order interface, the second user order interface comprising second order information for each of the second plurality of past transactions and one or more second items to order based on the second plurality of past transactions.

2. The system of claim 1, wherein each of the first order information and the second order information comprises one or more items purchased, one or more order instructions regarding the one or more items purchased, and an item type for each of the one or more items purchased.

3. The system of claim 1, wherein the transaction server is further configured to
   automatically send a message to a merchant device responsive to receiving the location information from at least one device selected from the first user device and the second user device, the message comprising at least one request selected from a first merchant ID associated with the first merchant and a second merchant ID associated with the second merchant.

4. The system of claim 3, wherein the transaction server identifies the first merchant within the predetermined proximity of the first user device using geo-fencing technologies.

5. The system of claim 1, wherein the first location information is determined by a global positioning system of the first user device.

6. The system of claim 1, wherein the first order information comprises stock keeping unit (SKU) level inventory information.

7. A computer implemented method configured to operate on open distributed system architecture, comprising:
- determining, by a first mobile device of a first user, that the first mobile device is within a predetermined proximity of a first merchant of a first plurality of merchants;
- determining, by a second mobile device of a second user, that the second mobile device is within a predetermined proximity of a second merchant of a first plurality of merchants;
- transmitting an indication to a transaction server indicating that the first mobile device is within the predetermined proximity of the first merchant and the second mobile device is within the predetermined proximity of the second merchant;
- retrieving, from a data storage, first transaction data associated with a first plurality of past transactions between the first merchant and a first user of the first user device;
- retrieving, from the data storage, second transaction data associated with a second plurality of past transactions between the second merchant and a second user of the second user device;
- determining a correlation between first transaction data and second transaction data by determining a cosine distance between the first transaction data and the second transaction data;
- when the correlation between the first transaction data and the second transaction data exceeds a predetermined threshold;
- generating a first user order interface for the first user device, the first user order interface comprising a first recommendation to make a first purchase at the second merchant; and
- generating a second user order interface for the second user device, the second user order interface comprising a second recommendation to make a second purchase at the first merchant;
- when the correlation between the first transaction data and the second transaction data does not exceed the predetermined threshold:
- generating the first user order interface, the first user order interface comprising first order information for each of the first plurality of past transactions and one or more first items to order based on the first plurality of past transactions; and
- generating the second user order interface, the second user order interface comprising second order information for each of the second plurality of past transactions and one or more second items to order based on the second plurality of past transactions.

8. The method of claim 7 further comprising:
- receiving, at the transaction server, social media information associated with a plurality of members of a user's social network; and
- generating a plurality of recommended products based on past transactions of members of the user's social network.

9. The method of claim 7, further comprising generating a plurality of merchant recommendations by:
- accessing a similar merchants table comprising a plurality of recommended merchants; and
- sorting the similar merchants table to identify the plurality of recommended merchants based on first transaction data associated with the first user and first location information generated by the first mobile device.

10. The method of claim 9, wherein identifying the plurality of recommended merchants to the first user comprises calculating a correlation between the first plurality of merchants and the first user based on a first user profile.

11. The method of claim 10, wherein the first user profile comprises indications of frequent merchants, previous orders, and suggested products.

* * * * *